United States Patent
Matoba et al.

(10) Patent No.: US 9,254,839 B2
(45) Date of Patent: Feb. 9, 2016

(54) CONTROL DEVICE

(71) Applicant: AISIN AW CO., LTD., Anjo-shi, Aichi-ken (JP)

(72) Inventors: Jyunichi Matoba, Anjo (JP); Tomohiro Kusamizu, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/362,013

(22) PCT Filed: Feb. 22, 2013

(86) PCT No.: PCT/JP2013/054574
§ 371 (c)(1),
(2) Date: May 30, 2014

(87) PCT Pub. No.: WO2013/125694
PCT Pub. Date: Aug. 29, 2013

(65) Prior Publication Data
US 2014/0329639 A1 Nov. 6, 2014

(30) Foreign Application Priority Data
Feb. 24, 2012 (JP) .................................. 2012-039399

(51) Int. Cl.
*B60W 10/06* (2006.01)
*B60W 20/00* (2006.01)
(Continued)

(52) U.S. Cl.
CPC .................. *B60W 20/40* (2013.01); *B60K 6/48* (2013.01); *B60K 6/547* (2013.01); *B60L 3/102* (2013.01); *B60L 3/106* (2013.01); *B60L 15/2009* (2013.01); *B60L 15/2054* (2013.01);
(Continued)

(58) Field of Classification Search
CPC .............. B60L 15/2054; Y10T 477/26; Y10T 477/656; Y10T 477/688; B60W 10/02; B60W 10/06; B60W 10/01; B60W 20/40; B60W 10/115
USPC ....................................................... 477/5, 115
See application file for complete search history.

(56) References Cited

U.S. PATENT DOCUMENTS

2003/0153429 A1* 8/2003 Boll ....................... B60K 6/442
477/6
2007/0102211 A1 5/2007 Nozaki et al.
(Continued)

FOREIGN PATENT DOCUMENTS

| JP | A-2007-131070 | 5/2007 | | |
|----|---|---|---|---|
| JP | A-2007-131071 | 5/2007 | | |
| JP | A-2008-213686 | 9/2008 | | |
| JP | A-2009-35172 | 2/2009 | | |
| JP | A-2010-30486 | 2/2010 | | |
| JP | WO 2013061449 A1 * | 5/2013 | ............... | B60K 6/48 |

*Primary Examiner* — Roger Pang
(74) *Attorney, Agent, or Firm* — Oliff PLC

(57) ABSTRACT

A control device for a vehicle. While subject control is performed, a second engagement control unit controls the engagement pressure of the second engagement device to a mid-control set pressure that has been set to be equal to or more than a first engagement pressure and equal to or less than a second engagement pressure. The first engagement pressure is a lower limit engagement pressure capable of maintaining the second engagement device in the directly coupled engaged state, in a state in which requested torque that is torque required to be transmitted to the wheels is transmitted to the wheels. The second engagement pressure is a lower limit engagement pressure capable of maintaining the second engagement device in the directly coupled engaged state, in a state in which maximum output torque of the rotary electric machine is transmitted to the wheels.

5 Claims, 9 Drawing Sheets

(51) Int. Cl.
*B60K 6/48* (2007.10)
*B60K 6/547* (2007.10)
*B60W 10/02* (2006.01)
*B60W 10/08* (2006.01)
*B60L 3/10* (2006.01)
*B60L 15/20* (2006.01)
*B60W 10/115* (2012.01)

(52) U.S. Cl.
CPC .............. *B60W 10/02* (2013.01); *B60W 10/06* (2013.01); *B60W 10/08* (2013.01); *B60W 10/115* (2013.01); *F16H 2200/0052* (2013.01); *Y02T 10/7275* (2013.01); *Y10S 903/902* (2013.01); *Y10T 477/26* (2015.01); *Y10T 477/656* (2015.01); *Y10T 477/688* (2015.01)

(56) References Cited

U.S. PATENT DOCUMENTS

| | | | |
|---|---|---|---|
| 2007/0114082 A1 | 5/2007 | Nozaki et al. | |
| 2012/0083953 A1* | 4/2012 | Izawa | B60W 30/20 701/22 |
| 2012/0088621 A1* | 4/2012 | Kasuya | B60K 6/387 475/5 |
| 2012/0271498 A1* | 10/2012 | Kobayashi | B60W 10/06 701/22 |
| 2013/0023380 A1* | 1/2013 | Sah | B60K 6/445 477/5 |
| 2013/0053214 A1* | 2/2013 | Kawai | B60W 10/02 477/5 |
| 2014/0229044 A1* | 8/2014 | Dai | B60W 20/30 701/22 |

* cited by examiner

|  | C1 | C2 | C3 | B1 | B2 |
|---|---|---|---|---|---|
| Rev |  |  | ○ |  | ○ |
| 1st | ○ |  |  |  | ○ |
| 2nd | ○ |  |  | ○ |  |
| 3rd | ○ |  | ○ |  |  |
| 4th | ○ | ○ |  |  |  |
| 5th |  | ○ | ○ |  |  |
| 6th |  | ○ |  | ○ |  |

CONTROL DEVICE

TECHNICAL FIELD

The present invention relates to a control device that controls a drive device for a vehicle provided with a speed change mechanism in a power transmission path connecting a rotary electric machine and wheels, and also provided with a plurality of engagement devices in the power transmission path.

BACKGROUND ART

As a control device that controls a drive device for a vehicle as a controlled object as described above, for example, a device described in Japanese Patent Application Publication No. 2010-030486 (JP 2010-030486 A) (Patent Document 1) is already known. This control device is structured to be capable of performing slip rotational speed control such that an engagement device (second clutch CL2 in Patent Document 1) provided between a rotary electric machine and wheels is brought into a slipping engaged state, and the rotational speed of the rotary electric machine approaches a target rotational speed. In this case, the target rotational speed is set to a sum of a synchronous rotational speed (transmission input rotational speed in Patent Document 1) and a target slip rotational speed. The synchronous rotational speed corresponds to a rotational speed of a speed change input shaft or the rotary electric machine when the engagement device is in a directly coupled engaged state.

A situation is conceivable in which, for example, a device (such as a hydraulic pressure control device) for controlling an engagement pressure of the engagement device does not operate as commanded, so that the engagement device that should be controlled so as to be in the slipping engaged state is brought into the directly coupled engaged state, differently from the command. If such a situation occurs during the execution of the slip rotational speed control described above, the slip rotational speed control is performed in which the target rotational speed is set to the sum of the synchronous rotational speed and the target slip rotational speed while the rotational speed of the rotary electric machine is limited to the synchronous rotational speed. In this state, the slip rotational speed control cannot appropriately be performed, so a largely fluctuating driving force may be transmitted to the wheels. However, Patent Document 1 does not particularly take note of this.

RELATED ART DOCUMENTS

Patent Documents

Patent Document 1: Japanese Patent Application Publication No. 2010-030486 (JP 2010-030486 A) (paragraph 0033, etc.)

SUMMARY OF THE INVENTION

Problem to be Solved by the Invention

Thus, it is desired to provide a control device that can appropriately perform control to bring the engagement device into the slipping engaged state.

Means for Solving the Problem

A first characteristic structure of a control device according to the present invention that controls a drive device for a vehicle provided with a speed change mechanism in a power transmission path connecting a rotary electric machine and wheels, and also provided with a plurality of engagement devices in the power transmission path is that the control device includes a slip rotational speed control unit that performs, as subject control, slip rotational speed control that controls an engagement pressure of a first engagement device serving as one of the engagement devices to a slip engagement pressure, sets a target rotational speed so as to maintain the first engagement device in a slipping engaged state, and controls a rotational speed of the rotary electric machine so as to approach the target rotational speed, and a second engagement control unit that controls an engagement pressure of a second engagement device that is an engagement device different from the first engagement device and is one of the engagement devices controlled so as to be in a directly coupled engaged state while the subject control is performed; in which, while the subject control is performed, the second engagement control unit controls the engagement pressure of the second engagement device to a mid-control set pressure that has been set to be equal to or more than a first engagement pressure and equal to or less than a second engagement pressure; the first engagement pressure is a lower limit engagement pressure capable of maintaining the second engagement device in the directly coupled engaged state, in a state in which requested torque that is torque required to be transmitted to the wheels is transmitted to the wheels; and the second engagement pressure is a lower limit engagement pressure capable of maintaining the second engagement device in the directly coupled engaged state, in a state in which maximum output torque of the rotary electric machine is transmitted to the wheels.

With the first characteristic structure, the engagement pressure of the second engagement device is controlled to the first engagement pressure or more while the subject control as the slip rotational speed control is performed. The first engagement pressure is the lower limit engagement pressure capable of maintaining the second engagement device in the directly coupled engaged state, in the state in which the requested torque that is the torque required to be transmitted to the wheels is transmitted to the wheels. As a result, while the subject control is performed, it is basically possible to transmit the requested torque to the wheels with the second engagement device in the directly coupled engaged state, and to bring the first engagement device into the appropriately slipping engaged state.

Furthermore, with the first characteristic structure, the engagement pressure of the second engagement device is controlled to the second engagement pressure or less while the subject control is performed. The second engagement pressure is the lower limit engagement pressure capable of maintaining the second engagement device in the directly coupled engaged state, in the state in which the maximum output torque of the rotary electric machine is transmitted to the wheels. As a result, when a situation occurs while the subject control is performed in which the state of engagement of the first engagement device changes to the directly coupled engaged state, differently from a command, and thus, the rotary electric machine for which the target rotational speed is set so as to maintain the first engagement device in the slipping engaged state increases the output torque thereof to maintain differential rotation of the first engagement device, the state of the second engagement device can be caused to transition to the slipping engaged state within a range of torque that can be output by the rotary electric machine. The transition of the state of the second engagement device to the slipping engaged state allows the rotational speed of the rotary electric machine to approach the target rotational speed, even with the first engagement device being in the directly coupled engaged state, and thus allows the subject control to be appropriately performed.

As described above, with the first characteristic structure, the control to bring the first engagement device into the slipping engaged state can appropriately be performed.

A second characteristic structure of a control device according to the present invention that controls a drive device for a vehicle provided with a speed change mechanism in a power transmission path connecting a rotary electric machine and wheels, and also provided with a plurality of engagement devices in the power transmission path is that the control device includes a first engagement control unit that controls, as subject control, an engagement pressure of a first engagement device serving as one of the engagement devices to a slip engagement pressure, and a second engagement control unit that controls an engagement pressure of a second engagement device that is an engagement device different from the first engagement device and is one of the engagement devices controlled so as to be in a directly coupled engaged state while the subject control is performed; in which an internal combustion engine is drivingly coupled to the rotary electric machine via a third engagement device; the control device is structured to perform, while the subject control is performed, internal combustion engine starting control that starts the internal combustion engine in a stop state while causing a state of the third engagement device to transition from a released state to the directly coupled engaged state; and while the subject control and the internal combustion engine starting control are performed based on a start request of the internal combustion engine in the directly coupled engaged state of the second engagement device, the second engagement control unit performs direct-coupling pressure reducing control that reduces the engagement pressure of the second engagement device to a pressure lower than that before the subject control and the internal combustion engine starting control are performed.

With the second characteristic structure, the internal combustion engine starting control is performed while the subject control is performed that controls the engagement pressure of the first engagement device to the slip engagement pressure. This can keep a shock associated with the start of the internal combustion engine from being transmitted to the power transmission path, when the internal combustion engine starting control is performed.

While the subject control and the internal combustion engine starting control are performed, the execution of the direct-coupling pressure reducing control reduces the engagement pressure of the second engagement device that was controlled to be in the directly coupled engaged state when the start request of the internal combustion engine was issued, to the pressure lower than that before the subject control and the internal combustion engine starting control are performed. Consequently, even when a situation occurs while the subject control is performed in which the state of engagement of the first engagement device changes to the directly coupled engaged state, differently from a command, and thus, the torque transmitted through the power transmission path increases, the state of the second engagement device can be caused to transition to the slipping engaged state earlier than a case of not performing the direct-coupling pressure reducing control by an extent corresponding to the reduction in the engagement pressure. As a result, for example, the driving force transmitted to the wheels can be kept from largely fluctuating.

As described above, with the second characteristic structure, the control to bring the first engagement device into the slipping engaged state can appropriately be performed.

The control device having the first or the second characteristic structure is preferably structured such that the first engagement control unit controlling the engagement pressure of the first engagement device performs direct-coupling engagement control that gradually increases the engagement pressure of the first engagement device from the slip engagement pressure to a direct-coupling engagement pressure on the condition that the subject control has been determined to be ended, and such that, while the first engagement control unit performs the direct-coupling engagement control, the second engagement control unit performs direct-coupling pressure increasing control that gradually increases the engagement pressure of the second engagement device, from the mid-control set pressure that is an engagement pressure while the subject control is performed, to a post-control set pressure that is higher than the mid-control set pressure.

With this structure, when the subject control ends, the direct-coupling engagement control is performed that gradually increases the engagement pressure of the first engagement device from the slip engagement pressure to the direct-coupling engagement pressure. This can keep a shock from being transmitted to the power transmission path when the direct-coupling engagement control starts.

Furthermore, with the above-described structure, the direct-coupling pressure increasing control to gradually increase the engagement pressure from the mid-control set pressure to the post-control set pressure is also performed for the second engagement device that can be brought into the slipping engaged state in place of the first engagement device. This direct-coupling pressure increasing control is performed while the direct-coupling engagement control of the first engagement device is performed. As a result, also when the second engagement device is in the slipping engaged state while the subject control is preformed, the transmission of a shock to the power transmission path can be reduced when the slip rotational speed control ends.

In the structure in which, as described above, the first engagement control unit performs the direct-coupling engagement control on the condition that the subject control has been determined to be ended, and the second engagement control unit performs the direct-coupling pressure increasing control while the first engagement control unit performs the direct-coupling engagement control, the second engagement control unit is preferably structured to increase the engagement pressure of the second engagement device so as to start the direct-coupling pressure increasing control in accordance with start of the direct-coupling engagement control by the first engagement control unit, and so as to end the direct-coupling pressure increasing control in accordance with end of the direct-coupling engagement control.

This structure allows the process to proceed to the next control more quickly than a case in which the direct-coupling pressure increasing control of the second engagement device ends after the direct-coupling engagement control of the first engagement device has ended.

The control device having any of the above-described structures is preferably structured such that an internal combustion engine is drivingly coupled to the rotary electric machine via a third engagement device, and while the subject control is performed, the control device performs internal combustion engine starting control that starts the internal combustion engine in a stop state while causing the state of the third engagement device to transition from a released state to the directly coupled engaged state.

This structure can keep a shock associated with the start of the internal combustion engine from being transmitted to the power transmission path, when the internal combustion engine starling control is performed.

The control device having any of the above-described structures is preferably structured to further include a hydraulic pressure control unit that controls a line pressure via a hydraulic pressure control device included in the drive device for a vehicle; in which the second engagement device is a hydraulically driven engagement device included in the speed change mechanism; the hydraulic pressure control device includes a hydraulic pressure control valve that receives supply of the line pressure and outputs a hydraulic pressure as an operating pressure to the second engagement device; when the second engagement control unit controls the second engagement device so as to be in the directly coupled engaged state so that the speed change mechanism establishes a shift speed, the second engagement control unit performs constant pressure control that sets a command value to the hydraulic pressure control valve for the output hydraulic pressure to a constant pressure higher than the line pressure; and further, the second engagement control unit prohibits execution of the constant pressure control while the subject control and the internal combustion engine starting control are performed based on the start request of the internal combustion engine in the directly coupled engaged state of the second engagement device.

This structure prohibits the execution of the constant pressure control for the second engagement device that was controlled to be in the directly coupled engaged state when the start request of the internal combustion engine was issued, while the subject control and the internal combustion engine starting control are performed. Thus, as described above, the control to maintain the first engagement device in the slipping engaged state can appropriately be performed by controlling the engagement pressure of the second engagement device to the mid-control set pressure, or by reducing the engagement pressure of the second engagement device to a pressure lower than that before the subject control and the internal combustion engine starting control are performed. In other words, with the above-described structure, both the internal combustion engine starting control and the subject control can appropriately be performed even in a structure in which the operating pressure of the engagement device controlled to be in the directly coupled engaged state to establish the shift speed is basically controlled to the line pressure.

The slipping engaged state of the first engagement device is a state in which transfer torque exists in the first engagement device, and in which a rotational speed difference exists between two members engaged by the first engagement device.

MODES FOR CARRYING OUT TUB INVENTION

Figure 1:
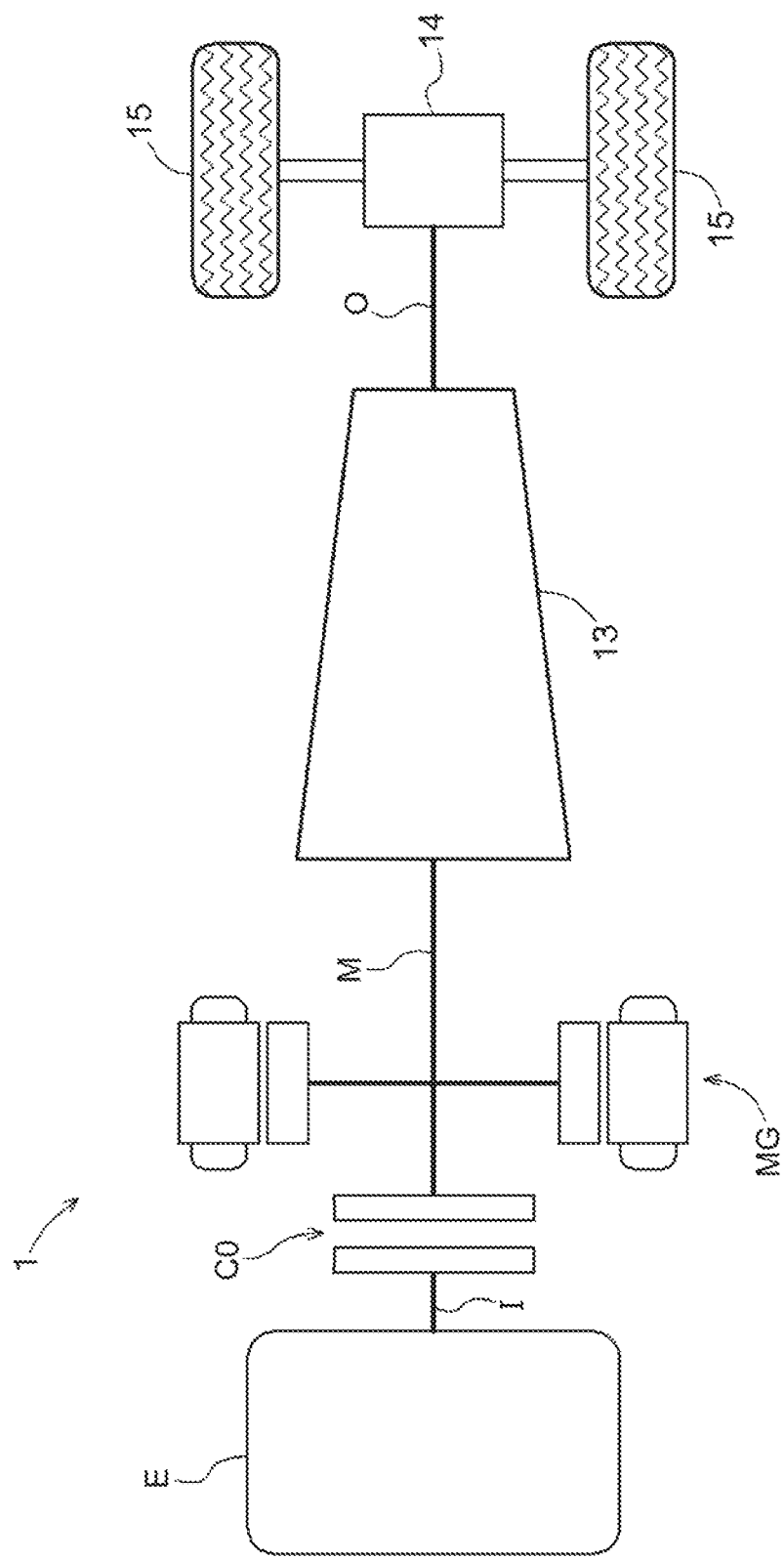
FIG. 1 is a schematic diagram showing an outline structure of a drive device for a vehicle according to an embodiment of the present invention.

An embodiment of a control device according to the present invention will be described with reference to the accompanying drawings. A control device 3 according to the present embodiment controls a drive device 1. In the present embodiment, as shown in FIG. 1, the drive device 1 is a drive device for a vehicle (drive device for a hybrid vehicle) for driving a vehicle (hybrid vehicle) equipped with both an internal combustion engine E and a rotary electric machine MG as a driving force source of wheels 15. The control device 3 according to the present embodiment will be described below in detail.

In the following description, the term "drivingly coupled" means a state in which two rotational members are coupled so as to be capable of transmitting a driving force (synonymous with torque), and is used as a concept that includes a state in which the two rotational members are coupled so as to rotate in an integrated manner, or a state in which the two rotational members are coupled so as to be capable of transmitting the driving force through one or two or more transmitting members (such as shafts, gear mechanisms, and belts). Such transmitting members may include an engagement device that selectively transmits the rotation and the driving force. A state in which rotational elements of a differential gear unit are "drivingly coupled" refers to a state in which three or more rotational elements provided in the differential gear unit are drivingly coupled to each other without any other member interposed therebetween.

In the following description of the engagement device (friction engagement device), the term "engaged state" refers to a state in which transfer torque exists in the engagement device, that is, a state in which the engagement device has a transfer torque capacity of more than zero. Therefore, when the engagement device is in an engaged state, the rotation and the torque are transferred between engagement members (between an input-side engagement member and an output-side engagement member) of the engagement device. The transfer torque capacity refers to an amount of maximum torque that can be transferred by the friction engagement device through friction. The amount of the transfer torque capacity changes in proportion to the engagement pressure (pressure to press the input-side engagement member and the output-side engagement member to each other) of the friction engagement device.

The "engaged state" includes a "directly coupled engaged state" and a "slipping engaged state". The "directly coupled engaged state" is the "engaged state" and also a state in which no rotational speed difference (slip) exists between the engagement members of the engagement device (a state in which the rotational speed difference is zero). The "slipping engaged state" is the "engaged state" and also a state in which a rotational speed difference (slip) exists between the engagement members of the engagement device (a state in which the rotational speed difference is more than zero).

The term "released state" refers to a state in which no transfer torque exists in the engagement device, that is, a state in which the transfer torque capacity of the engagement device is zero. Therefore, when the engagement device is in a released state, the rotation and the torque are not substantially transferred between the engagement members of the engagement device. The transfer torque may exist in the friction engagement device due to drag between the engagement members (friction members) while the control device 3 does not issue a command to produce the transfer torque. In the present specification, such drag torque that is produced when the engagement pressure is zero is not included in the transfer torque, in terms of classification of the state of engagement, and the state in which the drag between the engagement members produces the transfer torque while the command to produce the transfer torque is not issued is included in the "released state".

In the following description of the engagement pressure, the term "release pressure" represents a pressure at which the engagement device is constantly in the released state. The term "release boundary pressure" represents a pressure at which the engagement device is in a boundary state between the released state and the slipping engaged state. The term "engagement boundary pressure" represents a pressure at which the engagement device is in a boundary state between the slipping engaged state and the directly coupled engaged state. The term "full engagement pressure" represents a pressure at which the engagement device is constantly in the directly coupled engaged state. The term "slip engagement pressure" represents a pressure at which the engagement device is in the slipping engaged state. Specifically, the slip engagement pressure is set to a pressure higher than the release boundary pressure and lower than the engagement boundary pressure. The term "direct-coupling engagement pressure" represents a pressure at which the engagement device is in the directly coupled engaged state. Specifically, the direct-coupling engagement pressure is set to a pressure higher than the engagement boundary pressure and lower than the full engagement pressure. The full engagement pressure is set to, for example, the line pressure produced by a hydraulic pressure control device 26.

1. Structure of Drive Device

A description will be made of a structure of the drive device 1 serving controlled by the control device 3. As shown in FIG. 1, the drive device 1 includes a speed change mechanism 13 in a power transmission path connecting the rotary electric machine MG and the wheels 15. The power transmission path is provided with a plurality of engagement devices. Each of the engagement devices serves as an engagement device (engagement device for shifting) provided in the speed change mechanism 13, or an engagement device provided separately from the speed change mechanism 13. In the present embodiment, each of the engagement devices provided in the power transmission path between the rotary electric machine MG and the wheels 15 serves as the engagement device for shifting. In the present embodiment, the internal combustion engine E is drivingly coupled to the rotary electric machine MG via a disconnecting clutch C0. In other words, the drive device 1 according to the present embodiment includes the disconnecting clutch C0, the rotary electric machine MG, and the speed change mechanism 13 in that order from the internal combustion engine E along a power transmission path connecting the internal combustion engine E and the wheels 15. The drive device 1 transmits output torque of one or both of the internal combustion engine E and the rotary electric machine MG to the wheels 15 to drive the vehicle. In the present embodiment, the disconnecting clutch C0 corresponds to a third engagement device in the present invention.

The internal combustion engine E is a motor (such as a gasoline engine) that is driven by combustion of fuel in the engine to take out power. As shown in FIG. 1, the internal combustion engine E is drivingly coupled to an input shaft I serving as an input member of the drive device 1. In the present example, an internal combustion engine output shaft, such as a crankshaft of the internal combustion engine E, is drivingly coupled to the input shaft I so as to integrally rotate therewith. The internal combustion engine E is drivingly coupled to the rotary electric machine MG via the disconnecting clutch C0. In the present embodiment, the internal combustion engine E is equipped with neither a starter nor an alternator. To start the internal combustion engine E, a driving force of the rotary electric machine MG transmitted via the disconnecting clutch C0 rotationally drives (cranks) the output shaft of the internal combustion engine E.

The disconnecting clutch C0 is provided in the power transmission path between the internal combustion engine E and the rotary electric machine MG, and functions as an internal combustion engine disconnection engagement device for disconnecting the internal combustion engine E from, for example, the wheels 15 and the rotary electric machine MG. Specifically, the input-side engagement member of the disconnecting clutch C0 is drivingly coupled to the input shaft I without the output-side engagement member of the disconnecting clutch C0 interposed therebetween, and the output-side engagement member of the disconnecting clutch C0 is drivingly coupled to an intermediate shaft M without the input-side engagement member of the disconnecting clutch C0 interposed therebetween. A coupled state between the internal combustion engine E and the rotary electric machine MG and a separated state between the internal combustion engine E and the rotary electric machine MG are selectively established according to the state of engagement of the disconnecting clutch C0. In other words, the engaged state of the disconnecting clutch C0 leads to the coupled state between the internal combustion engine E and the rotary electric machine MG, and the released state of the disconnecting clutch C0 leads to the separated state between the internal combustion engine E and the rotary electric machine MG.

The term "coupled state" refers to a state (coupling maintenance state) in which coupling is maintained between two subject rotational members. In the coupling maintenance state, a driving force is transmitted between the two rotational members. The term "separated state" refers to a state (coupling cancel state) in which the coupling is released between the two subject rotational members. In the coupling cancel state, the driving force is not substantially transmitted between the two rotational members. Here, the above-mentioned drag torque is not also taken into account. In other words, the two rotational members are in the coupled state when the engagement device interposed between the two subject rotational members is in the engaged state (specifically, in the directly coupled engaged state or in the slipping engaged state), and the two rotational members are in the separated state when the engagement device interposed between the two subject rotational members is in the released state.

The disconnecting clutch C0 is structured as a friction engagement device. In the present embodiment, the disconnecting clutch C0 is structured as a hydraulically driven engagement device (such as a wet multi-plate clutch) including a hydraulic servomechanism that operates according to a supplied hydraulic pressure, and the engagement pressure of the disconnecting clutch C0 changes in proportion to the amount of the hydraulic pressure supplied to the disconnecting clutch C0. In other words, in the present embodiment, the amount of the transfer torque capacity of the disconnecting clutch C0 changes in proportion to the amount of the hydraulic pressure supplied to the disconnecting clutch C0.

Figure 4:
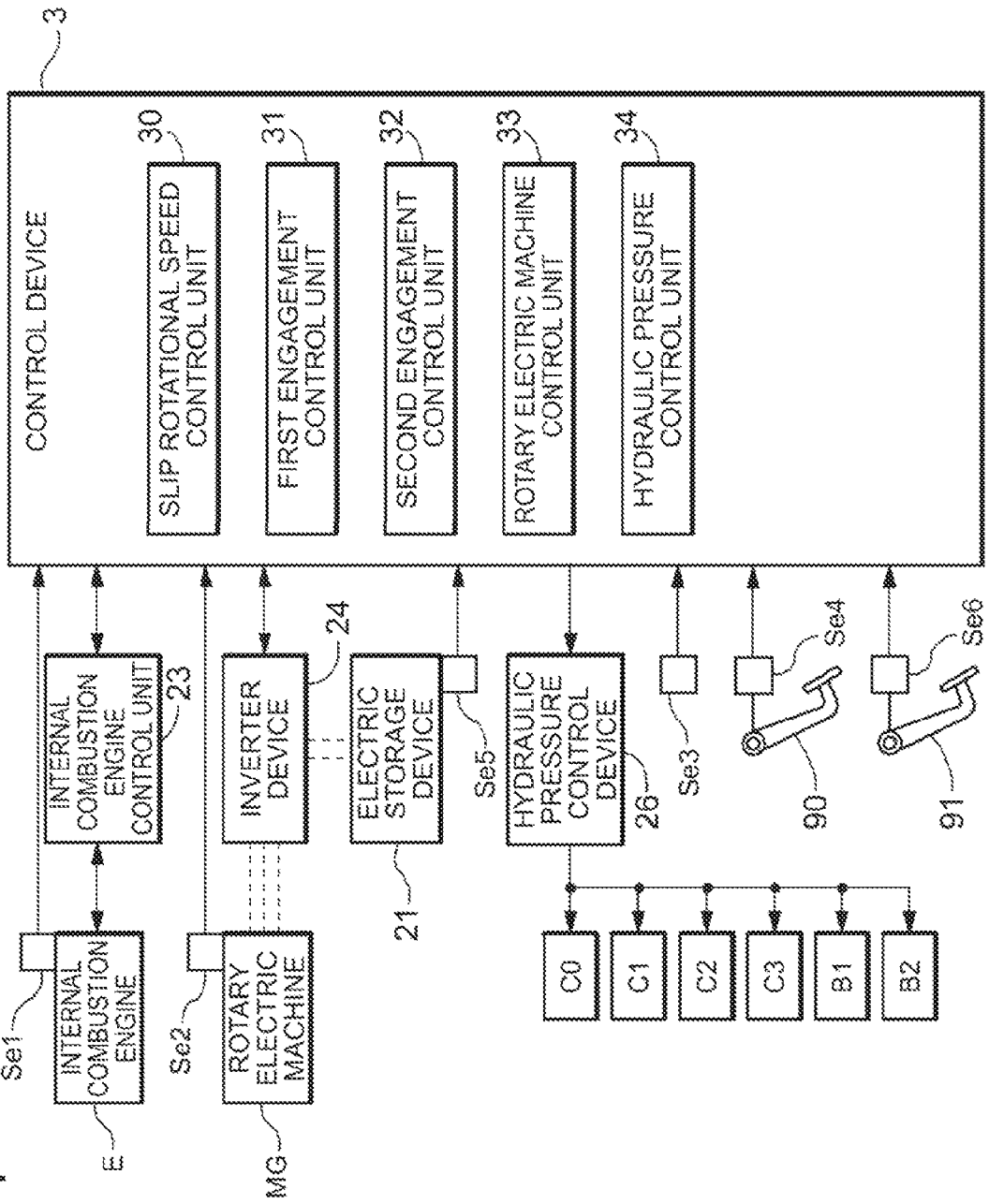
FIG. 4 is a block diagram showing an outline structure of a control device according to the embodiment of the present invention.

The rotary electric machine MG is provided in the power transmission path between the disconnecting clutch C0 and the wheels 15 (specifically, between the disconnecting clutch C0 and the speed change mechanism 13). The rotary electric machine MG is structured to include a rotor and a stator, and can serve as both a motor (electric motor) and a generator (electric generator). The rotor of the rotary electric machine MG is drivingly coupled to the intermediate shaft M serving as a speed change input shaft so as to integrally rotate therewith. As shown in FIG. 4, the rotary electric machine MG is electrically connected to an electric storage device 21 via an inverter device 24 (direct current/alternating current converter). The rotary electric machine MG is supplied with power from the electric storage device 21 to perform power running, or supplies power generated (regenerated) by the output torque of the internal combustion engine E or an inertial force of the vehicle to the electric storage device 21 to charge it. The electric storage device 21 is composed of, for example, a battery and/or a capacitor.

The speed change mechanism 13 includes an output shaft O drivingly coupled to the wheels 15. The speed change mechanism 13 changes a speed of rotation from the intermediate shaft M serving as the speed change input shaft based on a speed ratio (gear ratio), and transmits the changed rotational speed to the output shaft O serving as a speed change output shaft. The "speed ratio" is a ratio of the rotational speed of the intermediate shaft M (speed change input shaft) to the rotational speed of the output shaft O (speed change output shaft). The output shaft O is drivingly coupled to the two right and left wheels 15 via an output differential gear unit 14. Torque transmitted to the output shaft O is distributed by the output differential gear unit 14 to the two wheels 15.

Figures 2, 3:
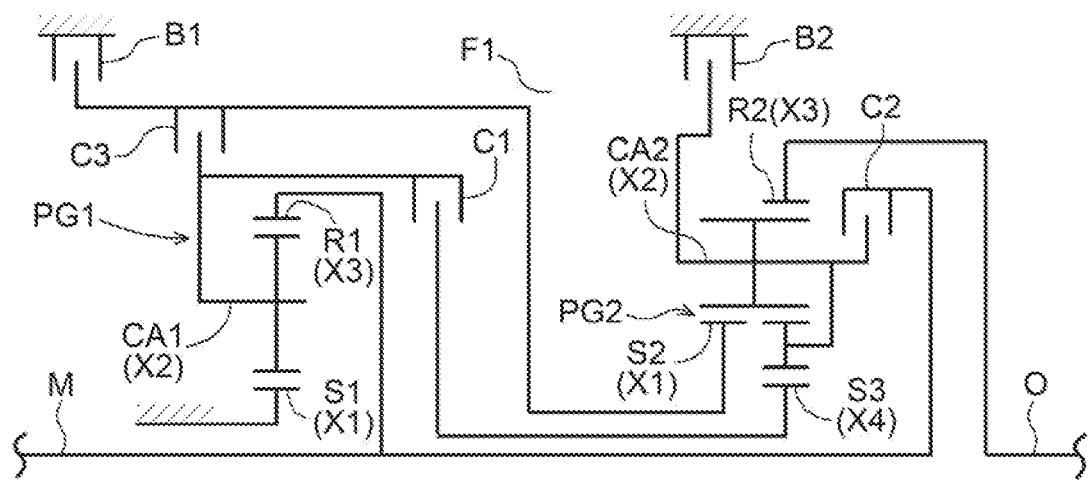
FIG. 2 is a schematic diagram showing an internal structure of a speed change mechanism according to the embodiment of the present invention.
FIG. 3 is an operation table of the speed change mechanism according to the embodiment of the present invention.

In the present embodiment, the speed change mechanism 13 is an automatic stepped speed change mechanism that is structured to be capable of switching between a plurality of shift speeds having different speed ratios. To establish the shift speeds, the speed change mechanism 13 includes a gear mechanism and a plurality of engagement devices for shifting that engage and release rotational elements of the gear mechanism. The speed change mechanism 13 switches the shift speed by controlling the state of engagement of each of the engagement devices for shifting. Each of the engagement devices for shifting is arranged in the power transmission path connecting the rotary electric machine MG and the wheels 15. As shown in FIG. 2, the engagement devices for shifting include a first clutch C1, a second clutch C2, a third clutch C3, a first brake B1, and a second brake B2. These engagement devices for shifting are also structured as respective friction engagement devices. In the present embodiment, each of the engagement devices for shifting is structured as a hydraulically driven engagement device (such as a wet multi-plate clutch or a wet multi-plate brake) including a hydraulic servomechanism that operates according to a supplied hydraulic pressure. In other words, in the present embodiment, the engagement pressure and the transfer torque capacity of each of the engagement devices for shifting change in proportion to the amount of the hydraulic pressure supplied to the engagement devices for shifting.

As shown in FIG. 2, the speed change mechanism 13 according to the present embodiment is constituted by a combination of two differential gear units, that is, a first differential gear unit PG1 and a second differential gear unit PG2. The first differential gear unit PG1 is constituted by a single-pinion planetary gear mechanism having a first sun gear S1, a first carrier CA1, and a first ring gear R1. In other words, the first differential gear unit PG1 has, in the order of rotational speed, a first rotational element X1, a second rotational element X2, and a third rotational element X3; the first sun gear S1 constituting the first rotational element X1, the first carrier CA1 constituting the second rotational element X2, and the first ring gear R1 constituting the third rotational element X3. The "order of rotational speed" means "the descending order or the ascending order of the rotational speed in the rotating state of the respective rotational elements", and is the same as the arrangement order of the respective rotational elements (order in which axes corresponding to the respective rotational elements are arranged) in a velocity diagram (collinear diagram, refer to FIG. 5).

The second differential gear unit PG2 is constituted by a Ravigneaux type planetary gear mechanism having a second sun gear S2, a third sun gear S3, a second carrier CA2, and a second ring gear R2. Specifically, the second differential gear unit PG2 is structured in such a manner that a single-pinion planetary gear mechanism constituted by the second sun gear S2, the second carrier CA2, and the second ring gear R2 and a double-pinion planetary gear mechanism constituted by the third sun gear S3, the second carrier CA2, and the second ring gear R2 share a part of a pinion gear, the carrier, and the ring gear. In other words, the second differential gear unit PG2 has, in the order of rotational speed, a first rotational element X1, a second rotational element X2, a third rotational element X3, and a fourth rotational element X4; the second sun gear S2 constituting the first rotational element X1, the second carrier CA2 constituting the second rotational element X2, the second ring gear R2 constituting the third rotational element X3, and the third sun gear S3 constituting the fourth rotational element X4.

The third rotational element X3 (first ring gear R1, in the present example) of the first differential gear unit PG1 is drivingly coupled to the intermediate shaft M so as to integrally rotate therewith, in the present example. The third rotational element X3 (second ring gear R2, in the present example) of the second differential gear unit PG2 is drivingly coupled to the output shaft O so as to integrally rotate therewith, in the present example. The second rotational element X2 (first carrier CA1, in the present example) of the first differential gear unit PG1 is drivingly coupled to the fourth rotational element X4 (third sun gear S3, in the present example) of the second differential gear unit PG2 via the first clutch C1, and also drivingly coupled to the first rotational element X1 (second sun gear S2, in the present example) of the second differential gear unit PG2 via the third clutch C3. The third rotational element X3 (first ring gear R1, in the present example) of the first differential gear unit PG1 is drivingly coupled to the second rotational element X2 (second carrier CA2, in the present example) of the second differential gear unit PG2 via the second clutch C2.

The first rotational element X1 (first sun gear S1, in the present example) of the first differential gear unit PG1 is fixed to a case (speed change mechanism case) serving as a non-rotational member. The first rotational element X1 (second sun gear S2, in the present example) of the second differential gear unit PG2 is selectively fixed to the case by the first brake B1. The second rotational element X2 (second carrier CA2, in the present example) of the second differential gear unit PG2 is selectively fixed to the case by the second brake B2.

As shown in an engagement table of FIG. 3, the speed change mechanism 13 controls particular two of the engagement devices for shifting so as to be in the engaged state (basically, in the directly coupled engaged state), and controls the other engagement devices for shifting so as to be in the released state, and thus establishes a target shift speed at each time. In FIG. 3, the mark "○" indicates that the corresponding engagement device for shifting is controlled to be in the engaged state (basically, in the directly coupled engaged state), and no mark indicates that the corresponding engagement device for shifting is controlled to be in the released state.

In FIG. 3, "1st" denotes a first speed; "2nd" a second speed; "3rd" a third speed; "4th" a fourth speed; "5th" a fifth speed; and "6th" a sixth speed. They are all shift speeds for forward travel (forward shift speeds). "Rev" denotes a shift speed for reverse travel (reverse shift speed). The speed ratio of each of the forward shift speeds is set so as to decrease stepwise from that of the first speed toward that of the sixth speed. For example, the first speed is established by controlling the first clutch C1 so as to be in the engaged state, and controlling the second brake B2 so as to be in the engaged state. For example, the second speed is established by controlling the first clutch C1 so as to be in the engaged state, and controlling the first brake B1 so as to be in the engaged state.

FIG. 5(a) shows an operating state of the speed change mechanism 13 at the first speed. As shown in FIG. 5(a), the output torque of at least one of the internal combustion engine E and the rotary electric machine MG (for example, rotary electric machine torque Tmg output by the rotary electric machine MG) is transmitted to the first ring gear R1 of the first differential gear unit PG1. At the first speed, the torque (positive torque except during power generation by the rotary electric machine MG) transmitted to the first ring gear R1 of the first differential gear unit PG1 is transmitted as input torque T1 to the third sun gear S3 of the second differential gear unit PG2 via the first carrier CA1 of the first differential gear unit PG1. The second carrier CA2 in the fixed state to the second brake B2 receives a reaction force of the positive input torque T1 acting on the third sun gear S3. This transmits the input torque T1 to the second ring gear R2 to which traveling torque To (travel resistance) is transmitted from the wheels 15. Regarding the direction of rotation or torque of the members, the present specification defines the same direction as the rotational direction of the internal combustion engine E as "positive, and the inverse direction thereof as "negative".

Figure 5:
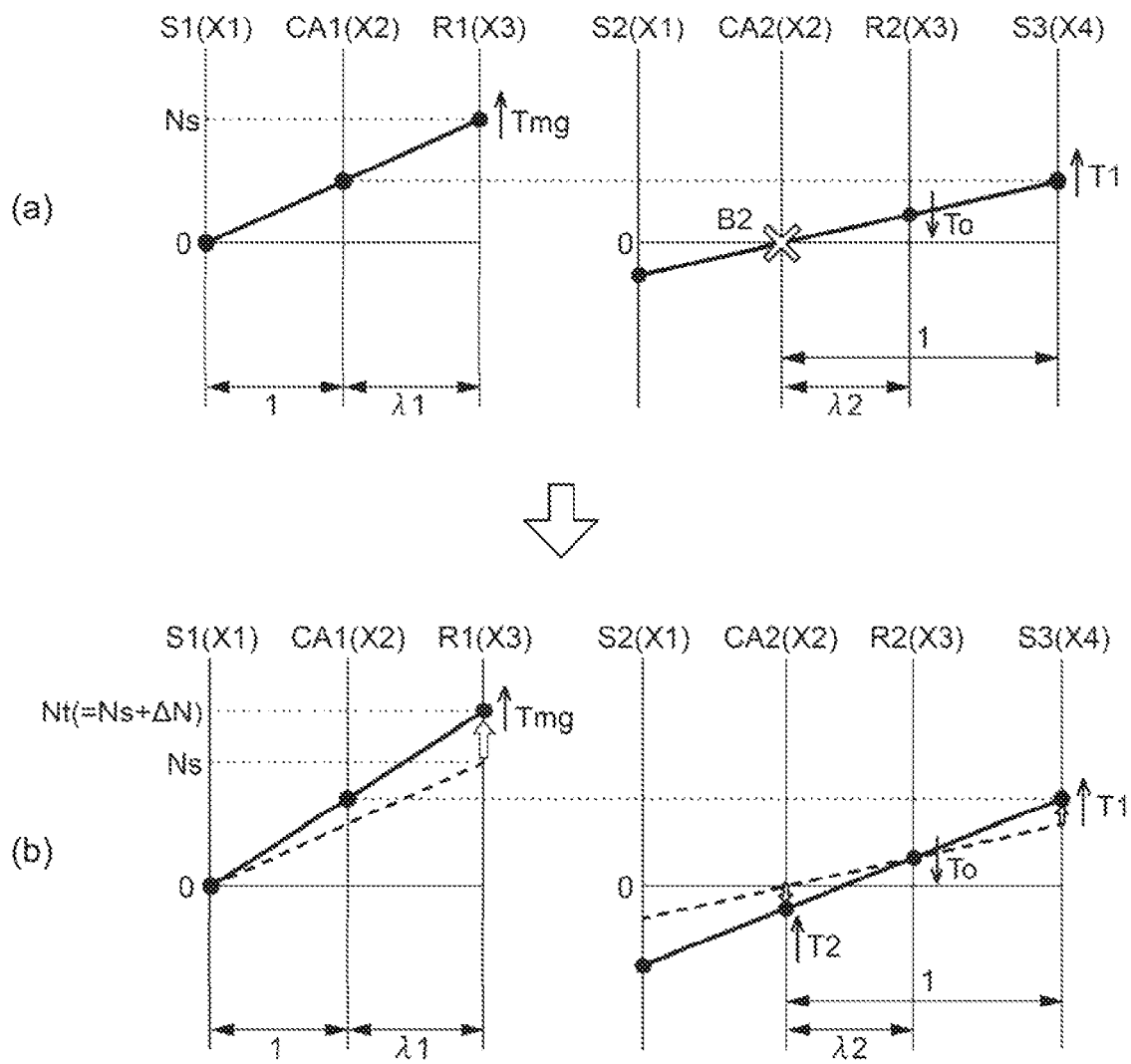
FIG. 5 shows velocity diagrams of the speed change mechanism according to the embodiment of the present invention, (a) showing a state before slip rotational speed control is performed, and (b) showing a state while the slip rotational speed control is performed.
Figure 6:
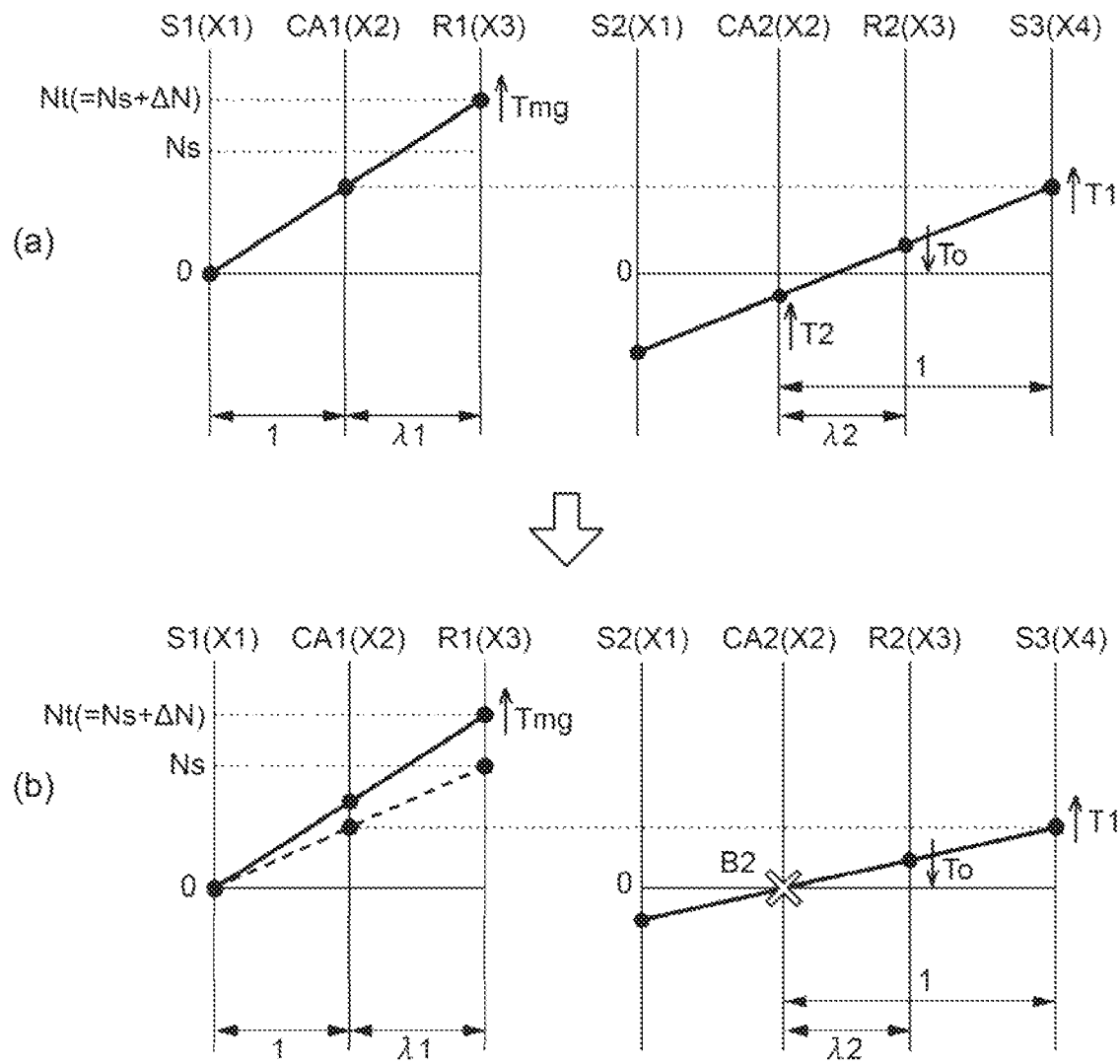
FIG. 6 shows velocity diagrams of the speed change mechanism while the slip rotational speed control according to the embodiment of the present invention is perforated, (a) showing a state in which the state of engagement of a second brake agrees with a command, and (b) showing a state in which the state of engagement of the second brake differs from the command.

The velocity diagrams shown in FIG. 5, and in FIG. 6 to be referred to later, represent operating states of the speed change mechanism 13, where the vertical axis corresponds to the rotational speed of each of the rotational elements. Specifically, "0" written corresponding to the vertical axis indicates that the rotational speed is zero, the upper side indicating the positive rotation (rotational speed being positive), and the lower side indicating the negative rotation (rotational speed being negative). FIG. 5 indicates the state in which a rotational element is fixed by a brake with a symbol having an X-shaped outline.

2. Structure of Control Device

A structure of the control device 3 according to the present embodiment will be described with reference to FIG. 4. As shown in FIG. 4, the control device 3 according to the present embodiment includes a plurality of functional units. The functional units are structured so as to be capable of sending and receiving information between each other. The control device 3 includes an arithmetic processing unit, such as a CPU, as a core, and is structured to include, for example, storage devices, such as a RAM and a ROM. Each of the functional units of the control device 3 is constituted by software (program) stored in the ROM or the like, or by hardware, such as a separately provided arithmetic circuit, or by both of them. For the functional units constituted by programs, the arithmetic processing unit included in the control device 3 operates as a computer executing the programs.

The control device 3 is structured to be capable of obtaining information on detection results of sensors Se1 to Se6 provided at various parts of the vehicle. The first rotation sensor Se1 is a sensor that detects a rotational speed of the internal combustion engine E or the input shaft I. The second rotation sensor Se2 is a sensor that detects the rotational speed of the rotor of the rotary electric machine MG or the intermediate shaft M, and is constituted by a resolver in the present example. The third rotation sensor Se3 is a sensor that detects the rotational speed of the output shaft O. The control device 3 derives a rotational speed of the wheels 15 or a vehicle speed, based on the detection result of the third rotation sensor Se3.

The accelerator operation amount sensor Se4 is a sensor that detects an accelerator operation amount by detecting an operation amount of an accelerator pedal 90 provided in the vehicle. The electric storage device sensor Se5 is a sensor that detects a state of the electric storage device 21, and in the present example, detects a state of charge (SOC) or an amount of charge of the electric storage device 23, and a temperature of the electric storage device 21. The brake operation sensor Se6 is a sensor that detects an operation amount of a brake pedal 91 provided in the vehicle.

The control device 3 is structured to be capable of sending and receiving information to and from an internal combustion engine control unit 23 that controls the operation of the internal combustion engine E. Based on a command from the control device 3, the internal combustion engine control unit 23 controls an operating point (output torque and rotational speed) of the internal combustion engine E. For example, when the control device 3 has issued a command for a target value of the output torque (target torque), the internal combustion engine control unit 23 performs torque control that controls the output torque of the internal combustion engine E so as to follow (or approach) the target torque. In addition, based on a command from the control device 3, the internal combustion engine control unit 23 switches the state of the internal combustion engine E between an operating state (starting state) and a stop state by performing start control and stop control of fuel injection and ignition.

2-1. Structure of Hydraulic Pressure Control Unit

A hydraulic pressure control unit 34 is a functional unit that controls supply of a hydraulic pressure to each of the engagement devices (C0, C1, C2, C3, B1, and B2). The hydraulic pressure control unit 34 outputs a hydraulic pressure command to each of the engagement devices according to a drive mode to be implemented and a shift speed to be established, and controls the hydraulic pressure supplied to each of the engagement devices via the hydraulic pressure control device 26. The state of engagement of each of the engagement devices is controlled to any one of the directly coupled engaged state, the slipping engaged state, and the released state. In the present embodiment, the hydraulic pressure control device 26 includes proportional solenoid valves, and can continuously control the hydraulic pressure supplied to each of the engagement devices according to the hydraulic pressure command of the hydraulic pressure control unit 34.

The hydraulic pressure control unit 34 controls the line pressure via the hydraulic pressure control device 26. Specifically, the hydraulic pressure control device 26 includes a line pressure control valve (such as a pressure regulator valve), which is not shown, for controlling a discharge pressure of a hydraulic pump to the line pressure, and the hydraulic pressure control unit 34 outputs a command to control a pressure adjustment value (control target value) for the line pressure control valve. The line pressure is a hydraulic pressure to which the discharge pressure of the hydraulic pump is adjusted, and is a pressure necessary for devices (the speed change mechanism 13, the disconnecting clutch C0, and the rotary electric machine MG, in the present embodiment) supplied with discharge oil of the hydraulic pump. This necessary hydraulic pressure is always calculated from, for example, the state of the speed change mechanism 13 (shifting in operation or not), the torque of the driving force source, the vehicle speed, a throttle opening, and the hydraulic pressures.

When the internal combustion engine starting control (described later) is performed, a hydraulic pressure serving as an operating pressure is supplied to the disconnecting clutch C0 that is controlled to be in the released state, and thus the state of the disconnecting clutch C0 transitions to the directly coupled engaged state. In the present embodiment, to appropriately perform such control of the disconnecting clutch C0 when the internal combustion engine starting control is performed, the hydraulic pressure control unit 34 performs control to increase the line pressure, and sets the line pressure during the execution of the internal combustion engine starting control higher than that before the execution thereof. The hydraulic pressure control unit 34 also increases the line pressure, for example, when the speed change mechanism 13 changes the shift speed.

While not shown, the hydraulic pressure control device 26 includes hydraulic pressure control valves (such as linear solenoid valves) each for controlling the operating pressure (hydraulic pressure, in the present example) supplied to corresponding one of the engagement devices. In the present embodiment, at least the hydraulic pressure control valves corresponding to the engagement devices for shifting (such as the first clutch C1) are each structured to receive the supply of the line pressure and output the hydraulic pressure as the operating pressure to the corresponding engagement device for shifting. In the present embodiment, when controlling the engagement device for shifting to be in the directly coupled engaged state so as to establish the shift speed, the hydraulic pressure control unit 34 controls the hydraulic pressure control device 26 so that the line pressure is basically supplied as the operating pressure to the engagement device for shifting. Specifically, when the engagement device for shifting is controlled to be in the directly coupled engaged state, the opening of the hydraulic pressure control valve for controlling the hydraulic pressure supplied to the engagement device for shifting is basically set to a full-open state.

Specifically, in the present embodiment, when controlling the engagement device for shifting to be in the directly coupled engaged state, the hydraulic pressure control unit 34 basically performs constant pressure control that sets the command value for the output hydraulic pressure issued to the hydraulic pressure control valve for controlling the hydraulic pressure supplied to the engagement device for shifting, to a constant pressure higher than the line pressure. When the engagement device for shifting is a second engagement device (described later), a second engagement control unit 32 performs the constant pressure control in cooperation with the hydraulic pressure control unit 34. Accordingly, in the present embodiment, when the line pressure is changed in the range of the above-described constant pressure or less, the hydraulic pressure supplied to the engagement device for shifting controlled to be in the directly coupled engaged state is automatically adjusted to the line pressure after the change. In other words, the opening of the hydraulic pressure control valve for controlling the hydraulic pressure supplied to the engagement device for shifting is maintained in the full-open state, so that, for example, an increase in the line pressure leads to a corresponding increase in the hydraulic pressure supplied to the engagement device for shifting. When the line pressure is above the constant pressure, the hydraulic pressure supplied to the engagement device for shifting controlled to be in the directly coupled engaged state is adjusted to the constant pressure.

As described above, the constant pressure during the execution of the constant pressure control is set to a pressure higher than the line pressure. For example, a command value for the line pressure generated by the hydraulic pressure control unit 34 is regarded as the line pressure in this case. Alternatively, for example, the current line pressure, that is, the line pressure at the start of execution of the constant pressure control is regarded as the line pressure in this case. The constant pressure can be set, for example, to or above an upper limit value of a range of adjustment of the line pressure by the hydraulic pressure control unit 34. The hydraulic pressure control valve for controlling the hydraulic pressure supplied to the engagement device for shifting is structured as a valve directly controlled by the command value for the output hydraulic pressure issued from the hydraulic pressure control unit 34, or as a valve controlled by a signal pressure from another valve directly controlled by the command value for the output hydraulic pressure issued from the hydraulic pressure control unit 34.

The hydraulic pressure control unit 34 performs torque control or rotational speed control to control the operations of the engagement devices. The "torque control" is control that sets a target value for the transfer torque capacity (target transfer torque capacity) of each of the engagement devices, and makes the transfer torque capacity of the engagement device follow (or approach) the target transfer torque capacity. The "rotational speed control" is control that sets a target value for the rotational speed difference (target rotational speed difference) between two engagement members engaged by the engagement device, and controls the transfer torque capacity of the engagement device to make the rotational speed difference follow (or approach) the target rotational speed difference. In the rotational speed control, when the rotational speed of one of the two engagement members is uniquely determined by another factor (such as the vehicle speed), the control is performed to make the rotational speed of the other engagement member follow (or approach) a target rotational speed.

2-2. Structure of Rotary Electric Machine Control Unit

A rotary electric machine control unit 33 is a functional unit that controls the operation of the rotary electric machine MG. The rotary electric machine control unit 33 controls an operating point (output torque and rotational speed) of the rotary electric machine MG by controlling the inverter device 24. In the present embodiment, the rotary electric machine control unit 33 performs torque control or rotational speed control to control the operation of the rotary electric machine MG. The "torque control" is control that sets a target value for the output torque (target torque) of the rotary electric machine MG, and makes the output torque of the rotary electric machine MG follow (or approach) the target torque. The "rotational speed control" is control that sets a target value for the rotational speed (target rotational speed) of the rotary electric machine MG, and controls the output torque of the rotary electric machine MG to make the rotational speed of the rotary electric machine MG follow (or approach) the target rotational speed.

The internal combustion engine E and the rotary electric machine MG are controlled so that an equilibrium relation is basically established in which the sum of the output torque of the internal combustion engine E and the output torque of the rotary electric machine MG is equal to a requested torque (vehicle requested torque). When the speed ratio of the speed change mechanism 13 is not "1", the above-described equilibrium relation is satisfied by converting the amounts of the torque into amounts of torque assumed to be transmitted to the same rotational member in the power transmission path. The requested torque is torque requested to be transmitted to the wheels 15. The control device 3 determines the requested torque, for example, based on the vehicle speed, the accelerator operation amount, and the state (such as the SOC) of the electric storage device 21, and, for example, with reference to a requested torque map (not shown). The control device 3 also determines the shift speed to be established by the speed change mechanism 13, for example, based on the vehicle speed and the accelerator operation amount, and, for example, with reference to a shift map (not shown).

Taking into account, for example, the need for charging of the electric storage device 21 and the energy efficiency of the entire vehicle, the control device 3 determines internal combustion engine requested torque (that is, a contribution by the internal combustion engine E to the requested torque) that is torque requested to be output from the internal combustion engine E, and rotary electric machine requested torque (that is, a contribution by the rotary electric machine MG to the requested torque) that is torque requested to be output from the rotary electric machine MG. When the control device 3 makes the rotary electric machine MG generate power, the rotary electric machine requested torque is set to negative torque that is needed to generate target generated power. Hereinafter, the absolute value of this negative torque is called "power generation torque". In this case, the rotary electric machine requested torque has a negative value, so that the internal combustion engine requested torque has a value larger than that of the requested torque by an amount of the power generation torque. Target power generation torque, that is, a target value for the power generation torque is obtained by dividing the target generated power by the rotational speed (target value or detected value) of the rotary electric machine MG. The need for the charging of the electric storage device 21 is determined based on the SOC of the electric storage device 21.

The control device 3 basically selects an electric drive mode when the internal combustion engine requested torque is zero, and selects a hybrid drive mode when the internal combustion engine requested torque is not zero. In the electric drive mode, the vehicle is driven by controlling the disconnecting clutch C0 to be in the released state, and transmitting the torque of the rotary electric machine MG to the wheels 15. In the hybrid drive mode, the vehicle is driven by controlling the disconnecting clutch C0 to be in the engaged state (basically, in the directly coupled engaged state), and transmitting the torque of both the internal combustion engine E and the rotary electric machine MG to the wheels 15. In this case, when the electric storage device 21 is charged, the rotary electric machine MG is controlled so as to output the negative torque (power generation torque), and thus, power is generated by the rotary electric machine MG.

2-3. Structure of Slip Rotational Speed Control Unit

A slip rotational speed control unit 30 is a functional unit that performs slip rotational speed control. The slip rotational speed control unit 30 performs the slip rotational speed control as subject control. The "slip rotational speed control" is control that controls the engagement pressure of a first engagement device (second brake B2 in a specific example described later) serving as one of the engagement devices provided in the power transmission path connecting the rotary electric machine MG and the wheels 15 to the slip engagement pressure, and that sets a target rotational speed Nt so as to maintain the first engagement device in the slipping engaged state, and makes the rotational speed of the rotary electric machine MG approach the target rotational speed Nt.

In the present embodiment, as described above, the engagement devices for shifting of the speed change mechanism 13 are arranged in the power transmission path connecting the rotary electric machine MG and the wheels 15, and one of the engagement devices for shifting serves as the first engagement device. Specifically, one of two of the engagement devices for shifting controlled to be in the engaged state to establish the shift speed serves as the first engagement device, and the other of the two serves as the second engagement device (described later). For example, when the shift speed to be established during the execution of the slip rotational speed control is the first speed (1st), one of the first clutch C1 and the second brake B2 serves as the first engagement device, and the other thereof serves as the second engagement device.

When a predetermined execution condition (start condition) for the slip rotational speed control is satisfied, the slip rotational speed control unit 30 determines to perform the slip rotational speed control. During the execution of the slip rotational speed control, the first engagement device serving as one of the engagement devices for shifting controlled to be in the engaged state to establish the shift speed at the time is controlled to be in the slipping engaged state. This can keep a torque change from being transmitted to the wheels 15 when the torque change is transmitted from the rotary electric machine MG side to the speed change mechanism 13. In view of this, in the present embodiment, the execution condition for the slip rotational speed control is satisfied when particular control is performed that involves the transmission of the torque change from the rotary electric machine MG side to the speed change mechanism 13, that is, when an execution condition for the particular control is satisfied. The particular control includes the internal combustion engine starting control that starts the internal combustion engine E in a stop state (described later as a specific example).

During the execution of the slip rotational speed control, the rotational speed of the intermediate shaft M or the rotary electric machine MG can be controlled to a speed different from a synchronous rotational speed Ns. The synchronous rotational speed Ns is a rotational speed of the intermediate shaft M under the assumption that both of the two engagement devices for shifting controlled to be in the engaged state to establish the shift speed at the time are controlled to be in the directly coupled engaged state, and is determined based on a product of the vehicle speed and the speed ratio. In a state (hereinafter called "particular low-speed state") in which the synchronous rotational speed Ns is lower than a lower limit value of the rotational speed of the intermediate shaft M at which the internal combustion engine E can continue a self-sustaining operation, the execution of the slip rotational speed control can control the rotational speed of the intermediate shaft M to a rotational speed equal to or above the lower limit value. As a result, in the particular low-speed state, by the execution of the slip rotational speed control, direct-coupling engagement power generation control can be performed that is control in which the disconnecting clutch C0 is controlled to be in the directly coupled engaged state, and thus, the rotary electric machine MG generates power with the torque output by the internal combustion engine E. In the present embodiment, the execution condition for the slip rotational speed control is also satisfied when the execution condition for the direct-coupling engagement power generation control is satisfied in the particular low-speed state as described above.

When a predetermined end condition for the slip rotational speed control is satisfied, the slip rotational speed control unit 30 determines to end the slip rotational speed control. In the present embodiment, the end condition for the slip rotational speed control is a condition based on a rotational speed difference between two members engaged by the first engagement device. Specifically, during the execution of the slip rotational speed control, the control is basically performed so that the rotational speed difference between the two members engaged by the first engagement device is equal to or above a predetermined end determination threshold. The rotational speed difference in this case is set according to details of other control (such as the internal combustion engine starting control) performed during the execution of the slip rotational speed control.

When the other control performed during the execution of the slip rotational speed control is ended, control is performed to reduce the rotational speed difference between the two members engaged by the first engagement device. When the rotational speed difference is reduced to less than the end determination threshold, the end condition for the slip rotational speed control is determined to be satisfied. The end determination threshold can be set to a value within the range of, for example, 10 rpm to 100 rpm.

2-4. Structure of First Engagement Control Unit

A first engagement control unit 31 is a functional unit that controls the engagement pressure of the first engagement device via the hydraulic pressure control unit 34 during the execution of the slip rotational speed control. In the specific example described later, the second brake B2 serves as the first engagement device.

On the condition that the slip rotational speed control has been determined to be executed, the first engagement control unit 31 performs slip engagement control to bring the first engagement device into the slipping engaged state. Specifically, when the first engagement device is in a state (hereinafter called "non-slip state") different from the slipping engaged state, the first engagement control unit 31 performs transition control to cause the state of the first engagement device to transition from the non-slip state to the slipping engaged state. If the first engagement device is in the slipping engaged state when the slip rotational speed control is determined to be executed, the transition control is omitted. After the state of the first engagement device has transitioned to the slipping engaged state, the first engagement control unit 31 performs maintenance control to maintain the first engagement device in the slipping engaged state. The non-slip state includes the directly coupled engaged state and the released state. In this manner, the first engagement control unit 31 performs the control that sets the engagement pressure of the first engagement device to the slip engagement pressure (control that issues a command so as to set the engagement pressure of the first engagement device to the slip engagement pressure), as subject control. The control device 3 performs at least the control that sets the engagement pressure of the first engagement device to the slip engagement pressure, as the subject control, and, in the present embodiment, further performs the control that sets the target rotational speed Nt so as to maintain the first engagement device in the slipping engaged state, and makes the rotational speed of the rotary electric machine MG approach the target rotational speed Nt.

The first engagement control unit 31 continues to perform the maintenance control to maintain the first engagement device in the slipping engaged state, until the subject control (here, the slip rotational speed control) is determined to be ended. Then, on the condition that the subject control (here, the slip rotational speed control) has been determined to be ended, the first engagement control unit 31 performs slip cancel control to bring the first engagement device into the non-slip state. Specifically, the first engagement control unit 31 performs the transition control to cause the state of the first engagement device to transition from the slipping engaged state to the non-slip state. After the state of the first engagement device has transitioned to the non-slip state, the first engagement control unit 31 performs maintenance control to maintain the first engagement device in the non-slip state. In the present embodiment, as the slip cancel control by the first engagement control unit 31, direct-coupling engagement control is performed to bring the first engagement device into the directly coupled engaged state.

In the present embodiment, the first engagement control unit 31 is structured to gradually increase (in other words, increase little by little, or sweep up) or gradually reduce (in other words, reduce little by little, or sweep down) the engagement pressure toward a target value when changing the engagement pressure of the first engagement device. As described above, in the present embodiment, the slip cancel control of the first engagement device serves as the direct-coupling engagement control that brings the first engagement device from the slipping engaged state into the directly coupled engaged state, and the first engagement control unit 31 performs the control to gradually increase the engagement pressure of the first engagement device from the slip engagement pressure to the direct-coupling engagement pressure during the execution of the direct-coupling engagement control. In other words, the direct-coupling engagement control of the first engagement device is control that increases (gradually increases, in the present example) a command value for the engagement pressure of the first engagement device from that of the slip engagement pressure to that of the direct-coupling engagement pressure.

2-5. Structure of Second Engagement Control Unit

The second engagement control unit 32 is a functional unit that controls the engagement pressure of the second engagement device via the hydraulic pressure control unit 34 during the execution of the slip rotational speed control. The second engagement device is an engagement device different from the first engagement device, and is an engagement device that is controlled to be in the directly coupled engaged state during the execution of the slip rotational speed control. In the specific example described later, the first clutch C1 serves as the second engagement device.

Specifically, while the subject control (here, the slip rotational speed control) is performed, the second engagement control unit 32 controls the engagement pressure of the second engagement device so as to be a mid-control set pressure Pa that is set to be equal to or more than the first engagement pressure and equal to or less than the second engagement pressure. The mid-control set pressure Pa is set, for example, to a pressure that is equal to or below the second engagement pressure, and that is obtained by multiplying the first engagement pressure by a predetermined coefficient. The coefficient can be a value within the range of, for example, 1.1 to 1.3.

The first engagement pressure is a lower limit engagement pressure capable of maintaining the second engagement device in the directly coupled engaged state, in a state (hereinafter called "requested torque transmitting state") in which the requested torque that is torque required to be transmitted to the wheels 15 is transmitted to the wheels 15. In other words, the first engagement pressure is the engagement boundary pressure of the second engagement device in the requested torque transmitting state. The second engagement pressure is a lower limit engagement pressure capable of maintaining the second engagement device in the directly coupled engaged state, in a state (hereinafter called "maximum output torque transmitting state") in which maximum output torque of the rotary electric machine MG is transmitted to the wheels 15. In other words, the second engagement pressure is the engagement boundary pressure of the second engagement device in the maximum output torque transmitting state.

To make an additional explanation, denoting the transfer torque (in other words, shared torque, hereinafter called "actual transfer torque") transferred by the second engagement device in the requested torque transmitting state as first transfer torque, the first engagement pressure is an engagement pressure that makes the transfer torque capacity of the second engagement device equal to the first transfer torque while the second engagement device is in the directly coupled engaged state. The first transfer torque is determined according to a gear ratio (in other words, a sharing ratio) determined based on an arrangement position of the second engagement device in the power transmission path connecting the rotary electric machine MG and the wheels 15, and to the requested torque. The engagement pressure that makes the transfer torque capacity of the second engagement device equal to the first transfer torque is determined according to the first transfer torque and a structure (such as areas and the number of friction plates) of the second engagement device.

Denoting the actual transfer torque of the second engagement device in the maximum output torque transmitting state as a second transfer torque, the second engagement pressure is an engagement pressure that makes the transfer torque capacity of the second engagement device equal to the second transfer torque while the second engagement device is in the directly coupled engaged state. The second transfer torque is determined according to the gear ratio determined based on the arrangement position of the second engagement device in the power transmission path connecting the rotary electric machine MG and the wheels 15, and to the maximum output torque of the rotary electric machine MG. The engagement pressure that makes the transfer torque capacity of the second engagement device equal to the second transfer torque is determined according to the second transfer torque and the structure (such as the areas and the number of the friction plates) of the second engagement device.

In the present embodiment, the maximum output torque of the rotary electric machine MG is variably set according to the rotational speed of the rotary electric machine MG, and also according to power that can be supplied from the electric storage device 21. The power that can be supplied from the electric storage device 21 is limited according to the state (such as the SOC and the temperature) of the electric storage device 21. As a result, in the present embodiment, when one of the engagement devices is specified as the second engagement device, the first engagement pressure is determined based on the requested torque, and the second engagement pressure is determined based on the rotational speed of the rotary electric machine MG and the state of the electric storage device 21.

In the present embodiment, the second engagement control unit 32 performs the control to set the engagement pressure of the second engagement device to the mid-control set pressure Pa on the condition that the slip rotational speed control has been determined to be executed. Specifically, the second engagement control unit 32 changes the engagement pressure (specifically, a command value thereof) of the second engagement device from an engagement pressure at the time to the mid-control set pressure Pa. The second engagement control unit 32 continues to perform the control to set the engagement pressure of the second engagement device to the mid-control set pressure Pa, until the slip rotational speed control is determined to be ended. On the condition that the slip rotational speed control has been determined to be ended, the second engagement control unit 32 performs control to set the engagement pressure of the second engagement device to a pressure (hereinafter called "post-control set pressure Pb") different from the mid-control set pressure Pa. Specifically, the second engagement control unit 32 changes the engagement pressure (specifically, the command value thereof) of the second engagement device from the mid-control set pressure Pa to the post-control set pressure Pb.

In the present embodiment, the post-control set pressure Pb is set to a pressure higher than the mid-control set pressure Pa. In other words, in the present embodiment, the control to change the engagement pressure of the second engagement device from the mid-control set pressure Pa to the post-control set pressure Pb serves as pressure increasing control that increases the engagement pressure. The post-control set pressure Pb is set, for example, to a pressure that is higher than the mid-control set pressure Pa, and that is obtained by multiplying the first engagement pressure by a predetermined coefficient. The coefficient can be a value within the range of, for example, 1.3 to 1.5. When various parts are operating as commanded during the execution of the slip rotational speed control, the second engagement device is maintained in the directly coupled engaged state. Thus, the control to increase the engagement pressure of the second engagement device from the mid-control set pressure Pa to the post-control set pressure Pb will hereinafter be called "direct-coupling pressure increasing control". In the present embodiment, the second engagement control unit 32 performs control to gradually increase the engagement pressure of the second engagement device from the mid-control set pressure Pa to the post-control set pressure Pb, as the direct-coupling pressure increasing control. In other words, the direct-coupling pressure increasing control is control that increases (gradually increases, in the present example) the command value for the engagement pressure of the second engagement device from the mid-control set pressure Pa to the post-control set pressure Pb.

In the present embodiment, the second engagement control unit 32 performs the direct-coupling pressure increasing control while the first engagement control unit 31 performs the above-described direct-coupling engagement control. Specifically, the second engagement control unit 32 is structured to start the direct-coupling pressure increasing control in accordance with the start of the direct-coupling engagement control by the first engagement control unit 31. The second engagement control unit 32 is also structured to increase the engagement pressure of the second engagement device so as to end the direct-coupling pressure increasing control in accordance with the end of the direct-coupling engagement control by the first engagement control unit 31.

An additional description will be made of the first and the second transfer torque described above, with an example in which the first engagement device corresponds to the second brake B2, and the second engagement device corresponds to the first clutch C1. FIG. 5(a) shows a state in which both the first clutch C1 and the second brake B2 are controlled to be in the directly coupled engaged state, and thus, the first speed is established in the speed change mechanism 13. In FIG. 5(a), "λ1" represents a ratio of the number of teeth between the first sun gear S1 and the first ring gear R1 of the first differential gear unit PG1, and "λ2" represents a ratio of the number of teeth between the third sun gear S3 and the second ring gear R2 of the second differential gear unit PG2.

Considering a state in which torque is balanced among the rotational elements of the speed change mechanism 13, the actual transfer torque transferred by the first clutch C1 is equal to the input torque T1, and the input torque T1 has a value obtained by multiplying the rotary electric machine torque Tmg output by the rotary electric machine MG by (1+λ1). As a result, the first transfer torque has a value obtained by multiplying the rotary electric machine requested torque set according to the requested torque by (1+λ1). In the state shown in FIG. 5(a), the rotary electric machine requested torque has a value obtained by multiplying the requested torque by [λ2/(1+λ1)]. The second transfer torque has a value obtained by multiplying the maximum output torque of the rotary electric machine MG by (1+λ1).

As described above, in the present embodiment, when the second engagement device serves as an engagement device for shifting, the second engagement control unit 32 performs the constant pressure control for the second engagement device. In the present embodiment, the second engagement control unit 32 is structured to prohibit the execution of the constant pressure control for the second engagement device while the subject control (here, the slip rotational speed control) and the internal combustion engine starting control are performed based on the start request of the internal combustion engine E in the directly coupled engaged state of the second engagement device serving as an engagement device for shifting.

3. Specific Details of Slip Rotational Speed Control

A description will be made of specific details of the slip rotational speed control performed by the control device 3 according to the present embodiment, with reference to a timing chart of FIG. 7. For simplicity, each of FIG. 7, and FIGS. 8 and 9 referred to later shows changes in the actual engagement pressures of the engagement devices on the assumption that the actual engagement pressures follow changes in the command values for the engagement pressures without delay. Unlike FIG. 7, FIGS. 8 and 9 referred to later omit plots for the disconnecting clutch C0.

A case will be described as an example in which the internal combustion engine starting control is performed during the execution of the subject control (here, the slip rotational speed control). Specifically, in the present example, during the execution of the slip rotational speed control, the internal combustion engine starting control is performed that starts the internal combustion engine E in the stop state while changing the state of the disconnecting clutch C0 from the released state to the directly coupled engaged state. The description will be made of a case in which the second brake B2 corresponds to the "first engagement device" in the present invention, and the first clutch C1 corresponds to the "second engagement device" in the present invention. In other words, in the present example, the first speed has been established in the speed change mechanism 13 during the execution of the slip rotational speed control. In the present example, the first clutch C1 serving as a hydraulically driven engagement device provided in the speed change mechanism 13 corresponds to the "second engagement device" in the present invention.

In the state before Time T01, as shown in FIG. 5(a), both the first clutch C1 and the second brake B2 are controlled to be in the directly coupled engaged state, and the rotational speed of the rotary electric machine MG is the same as the synchronous rotational speed Ns. In the present example, the second engagement device is an engagement device for shifting, and thus, the second engagement control unit 32 performs the constant pressure control for the first clutch C1 serving as the second engagement device in the state before Time T01. When an internal combustion engine start condition is satisfied (that is, when the start request of the internal combustion engine is issued) at Time T01, the execution condition for the slip rotational speed control is also satisfied, and thus, the first engagement control unit 31 performs the slip engagement control of the second brake B2. The internal combustion engine start condition is a condition for starting the internal combustion engine E in the stop state. The internal combustion engine start condition is satisfied when the vehicle is placed in a situation that requires power of the internal combustion engine E. For example, the internal combustion engine start condition is satisfied when a driver strongly presses the accelerator pedal 90 while the vehicle is stopped or traveling in the electric drive mode, and the requested torque cannot be obtained from only the rotary electric machine MG. The internal combustion engine start condition is also satisfied when the electric storage device 21 needs to be charged by staring the internal combustion engine E.

The slip engagement control of the second brake B2 causes the state of the second brake B2 to transition from the directly coupled engaged state to the slipping engaged state. In the present example, the second brake B2 is caused to transition to the slipping engaged state by gradually reducing the command value for the engagement pressure of the second brake B2 at a constant rate of change from the direct-coupling engagement pressure toward the slip engagement pressure. In other words, the slip engagement control of the first engagement device (second brake B2, in the present example) is control that reduces (gradually reduces, in the present example) the command value for the engagement pressure of the first engagement device from the direct-coupling engagement pressure to the slip engagement pressure. At Time T01, the second engagement control unit 32 performs the control to set the engagement pressure of the first clutch C1 to the mid-control set pressure Pa. The second engagement control unit 32 prohibits the constant pressure control for the first clutch C1 from Time T01 to Time T05. In the present example, the engagement pressure of the first clutch C1 is changed to the mid-control set pressure Pa by reducing the command value for the engagement pressure of the first clutch C1 in a stepwise manner from a pressure higher than the mid-control set pressure Pa to the mid-control set pressure Pa. The first clutch C1 is maintained in the directly coupled engaged state at this time. Thus, the control to reduce the engagement pressure of the first clutch C1 from a pressure higher than the mid-control set pressure Pa to the mid-control set pressure Pa will hereinafter be called "direct-coupling pressure reducing control". In other words, the direct-coupling pressure reducing control is control that reduces (in a stepwise manner, in the present example) the command value for the engagement pressure of the second engagement device (first clutch C1, in the present example) from a pressure higher than the mid-control set pressure Pa to the mid-control set pressure Pa. The second engagement control unit 32 may be structured to perform the direct-coupling pressure reducing control before Time T01, or between Time T01 and Time T02.

As described above, in the present example, while the subject control (here, the slip rotational speed control) and the internal combustion engine starting control are performed based on the start request of the internal combustion engine E in the directly coupled engaged state of the first clutch C1 (an example of the second engagement device), the second engagement control unit 32 performs the direct-coupling pressure reducing control that reduces the engagement pressure (specifically, the command value thereof) of the first clutch C1 (an example of the second engagement device) to a pressure lower than that before the execution of the subject control (here, the slip rotational speed control) and the internal combustion engine starting control. While the direct-coupling pressure reducing control can set the amount of the reduction in the engagement pressure to any value, the direct-coupling pressure reducing control in the present example reduces the engagement pressure of the second engagement device to the mid-control set pressure Pa.

When the state of the second brake B2 is determined to have transitioned to the slipping engaged state (Time T02), the rotary electric machine control unit 33 sets the target rotational speed Nt so as to maintain the second brake B2 in the slipping engaged state, and starts the rotational speed control (specifically, rotational speed feedback control) to make the rotational speed of the rotary electric machine MG approach the target rotational speed Nt. In the present embodiment, the target rotational speed Nt is set so as to differ by a constant amount (ΔN) from the synchronous rotational speed Ns (refer to FIG. 5(b)). ΔN is set to a value within the range of for example, 50 rpm to 200 rpm.

In this state, as shown in FIG. 5(b), slip torque T2 generated by the transfer torque capacity of the second brake B2 receives the reaction force of the positive input torque T1 acting on the third sun gear S3. In the present embodiment, when the rotational speed difference between the rotational speed of the rotary electric machine MG or the intermediate shaft M and the synchronous rotational speed Ns reaches a predetermined slip determination threshold, the second brake B2 is determined to have transitioned to the slipping engaged state. The slip determination threshold is set to a value within the range of, for example, 10 rpm to 100 rpm. The control device 3 can be structured to determine that the second brake B2 has transitioned to the slipping engaged state when time elapsed from Time T01 reaches a predetermined change determination time.

At Time T02, the hydraulic pressure control unit 34 also performs the engagement control of the disconnecting clutch C0. In the present example, at first, the disconnecting clutch C0 is controlled to be in the slipping engaged state, and the torque of the rotary electric machine MG transmitted via the disconnecting clutch C0 increases the rotational speed of the internal combustion engine E. When the rotational speed difference between the rotational speeds of the internal combustion engine E and the rotary electric machine MG reaches a synchronized state of less than a predetermined synchronization determination threshold at Time T03, the hydraulic pressure control unit 34 performs the control to bring the disconnecting clutch C0 into the directly coupled engaged state. In the present example, the disconnecting clutch C0 is caused to transition to the directly coupled engaged state by gradually increasing a command value for the engagement pressure of the disconnecting clutch C0 at a constant rate of change from the slip engagement pressure toward the direct-coupling engagement pressure. The synchronization determination threshold is set to a value within the range of, for example, 10 rpm to 100 rpm. Ignition (starting) of the internal combustion engine E is performed in a state in which the rotational speed of the internal combustion engine E reaches a predetermined ignition possible rotational speed or more, and performed between Time T02 and Time T03, in the present example. In the present example, after Time T03, control is performed to increase the slip engagement pressure of the brake B2 in accordance with an increase in the requested torque.

Thereafter, the rotary electric machine control unit 33 performs control to gradually reduce the target rotational speed Nt toward the synchronous rotational speed Ns. When the end condition for the slip rotational speed control is satisfied at Time T04, the first engagement control unit 31 performs the direct-coupling engagement control of the second brake B2. In the present embodiment, based on the rotational speed difference between the rotational speed of the rotary electric machine MG and the synchronous rotational speed Ns that is proportional to the rotational speed difference between the two members engaged by the second brake B2 (equal to the rotational speed of the second carrier CA2, in the present example), the end condition for the slip rotational speed control is determined to be satisfied on the condition that the rotational speed difference has become less than a predetermined determination threshold. This determination threshold is set so that the rotational speed difference between the two members engaged by the second brake B2 agrees with the above-described end determination threshold, in the state in which the rotational speed difference between the rotational speed of the rotary electric machine MG and the synchronous rotational speed Ns agrees with the determination threshold. This determination threshold is set to a value contained in the range of, for example, 10 rpm to 100 rpm. The control device 3 can be structured to determine that the end condition for the slip rotational speed control is satisfied when elapsed time reaches a predetermined determination time since the control has started to gradually reduce the target rotational speed Nt toward the synchronous rotational speed Ns.

The direct-coupling engagement control of the second brake B2 causes the state of the second brake B2 to transition from the slipping engaged state to the directly coupled engaged state. In the present example, the second brake B2 is caused to transition to the directly coupled engaged state by gradually increasing the command value for the engagement pressure of the second brake B2 at a constant rate of change from the slip engagement pressure toward the direct-coupling engagement pressure. At Time T04, the second engagement control unit 32 performs the direct-coupling pressure increasing control to increase the engagement pressure of the first clutch C1 to the post-control set pressure Pb. In the present example, the engagement pressure of the first clutch C1 is changed to the post-control set pressure Pb by gradually increasing the command value for the engagement pressure of the first clutch C1 from the mid-control set pressure Pa toward the post-control set pressure Pb.

In the present example, at Time T05, the direct-coupling engagement control of the second brake B2 ends, and the direct-coupling pressure increasing control of the first clutch C1 ends. In this manner, in the present example, the direct-coupling pressure increasing control of the first clutch C1 starts in accordance with the start of the direct-coupling engagement control of the second brake B2, at Time T04. The rate of change in the engagement pressure of the second brake B2 during the execution of the direct-coupling engagement control and the rate of change in the engagement pressure of the first clutch C1 during the execution of the direct-coupling pressure increasing control are set, so that the direct-coupling pressure increasing control of the first clutch C1 ends in accordance with the end of the direct-coupling engagement control of the second brake B2, at Time T05. The example shown in FIG. 7 illustrates, as an example, a case in which the command value for the engagement pressure of the second brake B2 is slightly increased in a stepwise manner, and the command value for the engagement pressure of the first clutch C1 is slightly increased in a stepwise manner, at Time T05 when both the direct-coupling engagement control of the second brake B2 and the direct-coupling pressure increasing control of the first clutch C1 end. In the present example, at Time T05, the second engagement control unit 32 resumes the constant pressure control for the first clutch C1 serving as the second engagement device.

Figure 7:
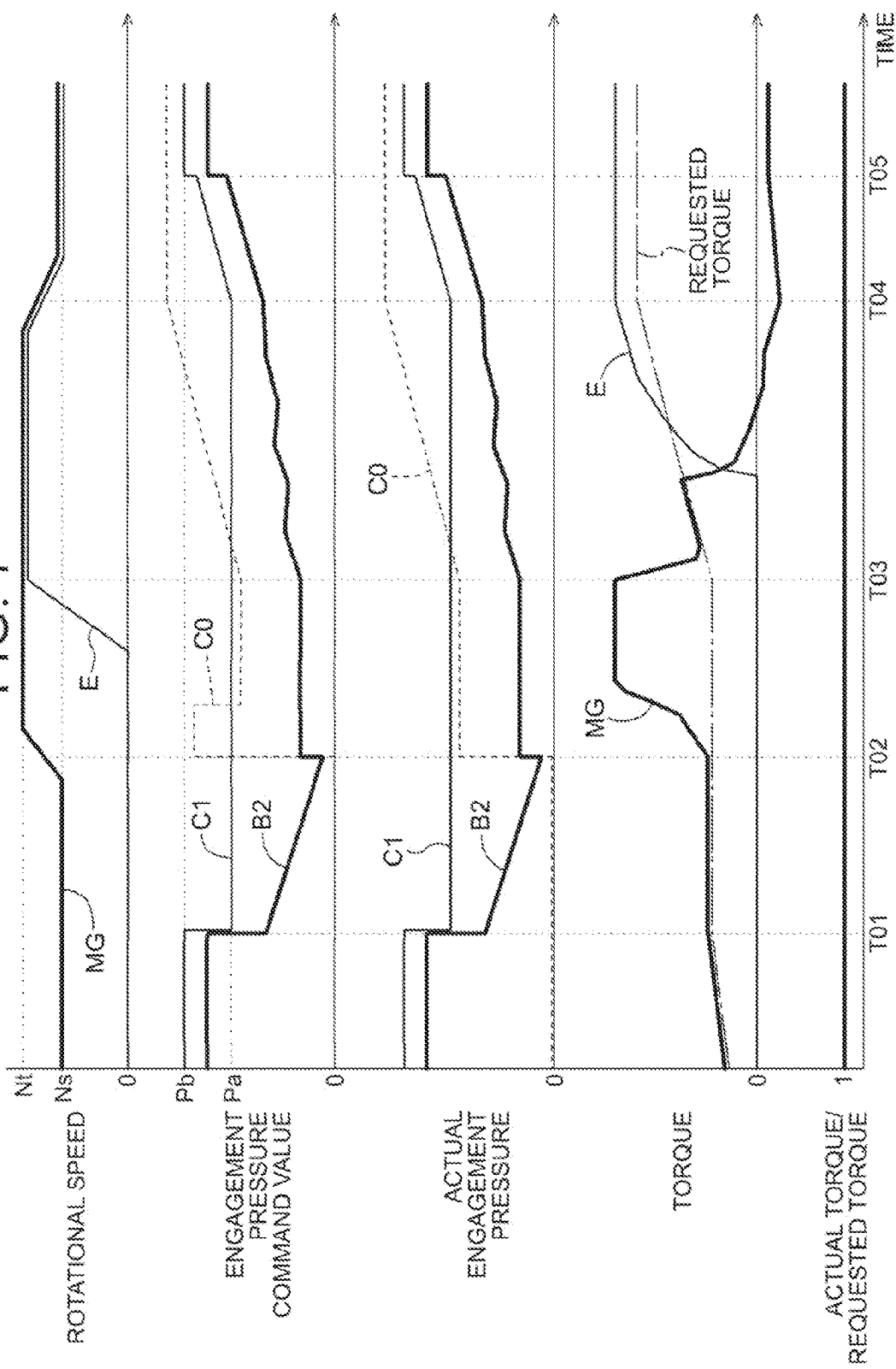
FIG. 7 is a timing chart showing an example of operating states of respective parts when the slip rotational speed control according to the embodiment of the present invention is performed.

The example shown in FIG. 7 described above is an example of a case in which the state of engagement of the second brake B2 agrees with the command. Next, with reference to FIG. 8, a case will be described in which the state of engagement of the second brake B2 differs from the command. Times T10, T11, T13, T14, and T15 in FIG. 8 correspond to Times T01, T02, T03, T04, and T05, respectively, in FIG. 7, and the same process is performed at each corresponding pair of the times. The example of FIG. 8 described below shows a case in which the state of engagement of the second brake B2 is different from the command at Time T12, and the second brake B2 is maintained in the directly coupled engaged state, after Time T12.

Figure 8:
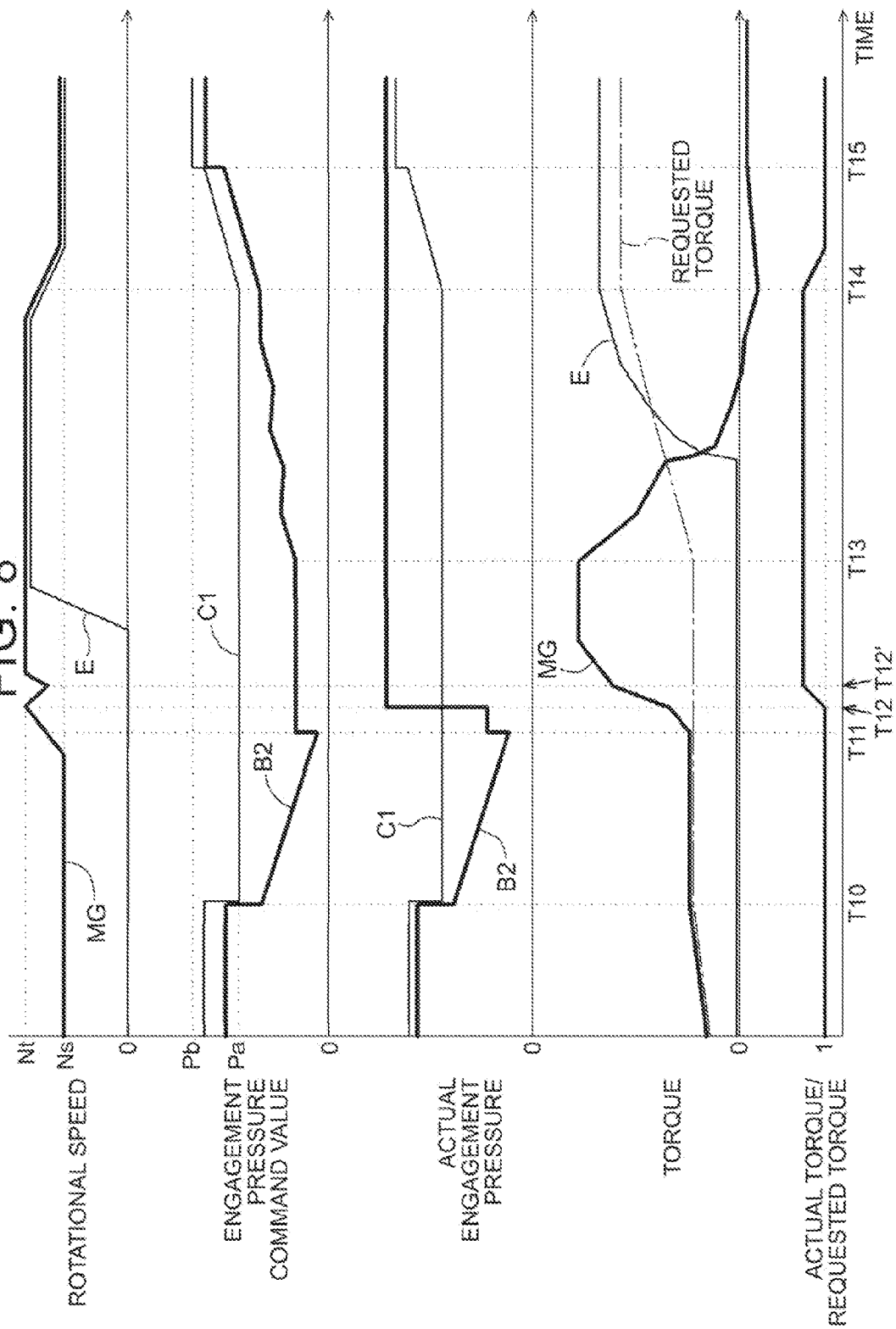
FIG. 8 is a timing chart showing another example of the operating states of the respective parts when the slip rotational speed control according to the embodiment of the present invention is performed.

At Time T12, when the state of the second brake B2 changes, differently from the command, from the slipping engaged state (state shown in FIG. 6(a)) to the directly coupled engaged state (state shown in FIG. 6(b)), negative torque acts via the first clutch C1 on the rotary electric machine MG to reduce the rotational speed thereof. At this time, the rotational speed control is controlling the rotary electric machine MG based on the target rotational speed Nt. This leads to a state in which the rotary electric machine MG outputs larger torque than that in the slipping engaged state of the second brake B2, in order to maintain the rotational speed at (or approximate the rotational speed to) the target rotational speed Nt, as shown in FIG. 8. As described above, the engagement pressure of the first clutch C1 is set to the mid-control, set pressure Pa, which in turn is set to a pressure lower than the second engagement pressure in the present example. As described above, the second engagement pressure is the lower limit engagement pressure capable of maintaining the first clutch C1 in the directly coupled engaged state, in the state in which the maximum output torque of the rotary electric machine MG is transmitted to the wheels 15.

As a result, the state of the first clutch C1 transitions from the directly coupled engaged state to the slipping engaged state (at Time T12') by the time when the torque of the rotary electric machine MG reaches the maximum output torque thereof. Consequently, even when the second brake B2 is caused to transition to the directly coupled engaged state differently from the command, bringing the first clutch C1 into the slipping engaged state can make the rotational speed of the rotary electric machine MG agree with (or approach) the target rotational speed Nt, as shown on the left side of FIG. 6(b). In this case, the increase in the torque of the rotary electric machine MG maintains the first clutch C1 in the slipping engaged state, without changing the engagement pressure of the first clutch C1. This make the actual torque larger than the requested torque during the execution of the slip rotational speed control, as FIG. 8 shows, as "ACTUAL TORQUE/REQUESTED TORQUE", a transition of a value obtained by dividing the torque (actual torque) transmitted to the wheels 15 by the requested torque. However, the amount of the increase in the actual torque is smaller than that shown in FIG. 9. Thus, in the case in which the state of engagement of the second brake B2 differs from the command, the ratio by which the actual torque transmitted to the wheels 15 exceeds the requested torque can be made smaller.

Figure 9:
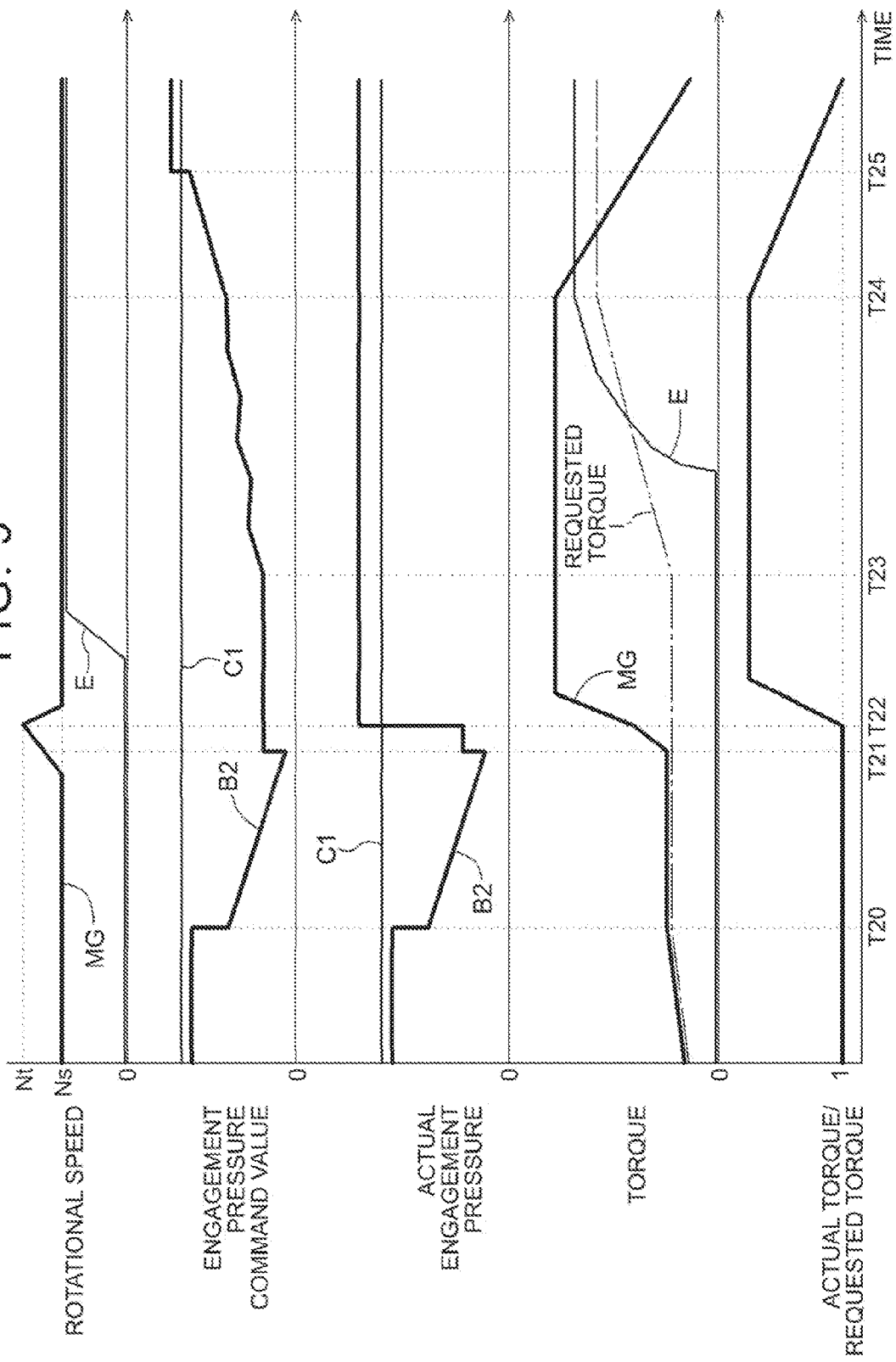
FIG. 9 is a timing chart showing an example of the operating states of the respective parts when the slip rotational speed control according to a comparative example is performed.

FIG. 9 shows a comparative example to which the present invention is not applied, showing an example of maintaining the engagement pressure of the first clutch C1 at a pressure higher than the second engagement pressure during the execution of the slip rotational speed control. Times T20, T21, T22, T23, T24, and T25 in FIG. 9 correspond to Times T10, T11, T12, T13, T14, and T15, respectively, in FIG. 8, and the same process except the control of the engagement pressure of the first clutch C1 is performed at each corresponding pair of the times. In the comparative example shown in FIG. 9, the first clutch C1 is maintained in the directly coupled engaged state even after the torque of the rotary electric machine MG has reached the maximum output torque thereof. This leads to a state in which the rotary electric machine MG continues outputting the relatively large torque so as to approximate the rotational speed of the rotary electric machine MG to the target rotational speed Nt higher than the synchronous rotational speed Ns, until the slip rotational speed control ends. This, in turn, makes the ratio by which the actual torque transmitted to the wheels 15 exceeds the requested torque larger than that of the application example of the present invention shown in FIG. 8, as shown as "ACTUAL TORQUE/REQUESTED TORQUE" in FIG. 9.

While the case has been described as an example in which the internal combustion engine starting control is performed during the execution of the subject control (here, the slip rotational speed control), it is clear that the first engagement device and the second engagement device can also be controlled in the same manner when the internal combustion engine starting control is not performed during the execution of the subject control (here, the slip rotational speed control). For example, the control device 3 can be structured as follows: When the slip rotational speed control is performed so as to perform the direct-coupling engagement power generation control in the particular low-speed state in which the synchronous rotational speed Ns is lower than the lower limit value of the rotational speed of the intermediate shaft M at which the internal combustion engine E can continue a self-sustaining operation, the second engagement control unit 32 controls the engagement pressure of the second engagement device to the mid-control set pressure Pa during the execution of the slip rotational speed control. As described above, the direct-coupling engagement power generation control is the control in which the disconnecting clutch C0 is controlled to be in the directly coupled engaged state, and thus, the rotary electric machine MG generates power with the torque output by the internal combustion engine E.

4. Processing Procedure of Slip Rotational Speed Control

Figure 10:
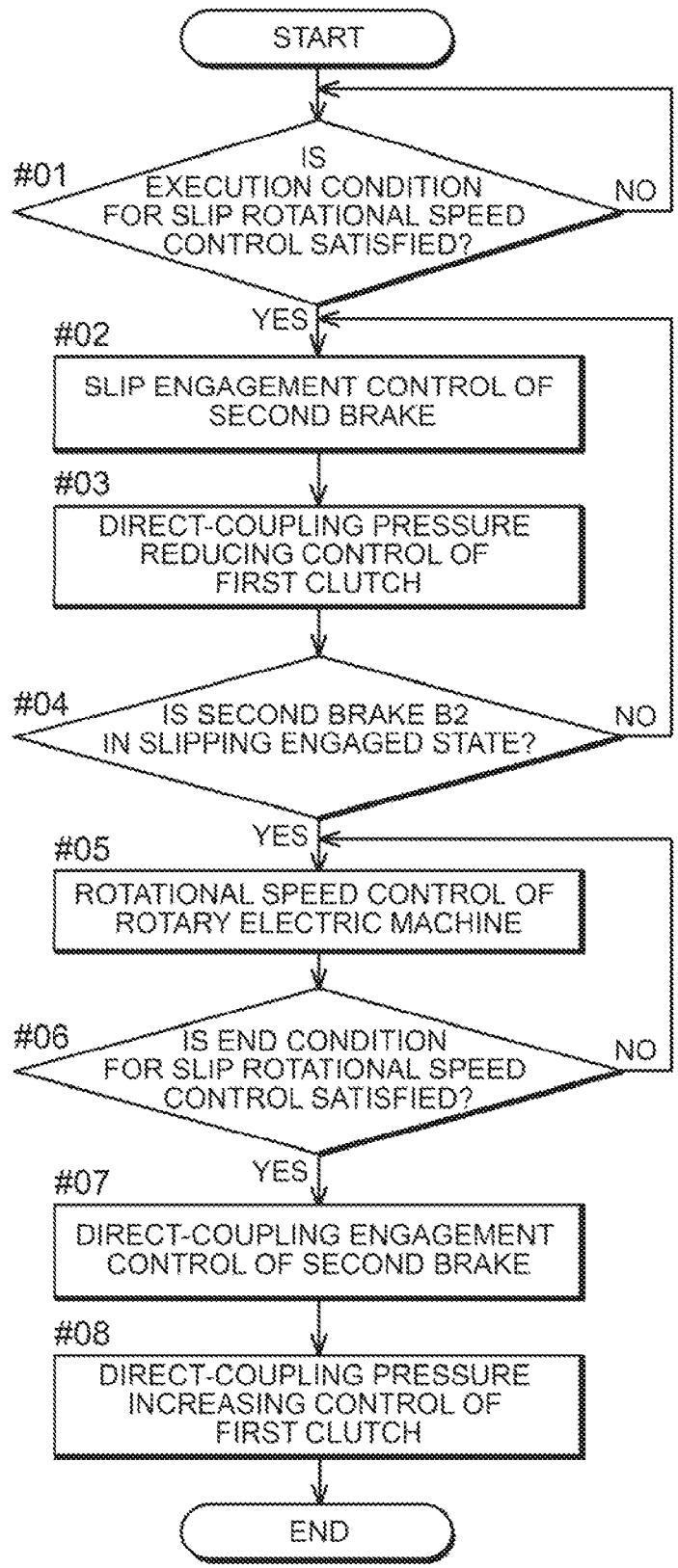
FIG. 10 is a flowchart showing a processing procedure of the slip rotational speed control according to the embodiment of the present invention.

A description will be made of a processing procedure of the slip rotational speed control according to the present invention, with reference to a flowchart of FIG. 10. The functional units of the control device 3 execute steps of the processing procedure described below. In addition, in this description, the second brake B2 corresponds to the "first engagement device" in the present invention, and the first clutch C1 corresponds to the "second engagement device" in the present invention.

When the execution condition for the slip rotational speed control is satisfied (Yes at Step #01), the slip engagement control of the second brake B2 is performed (Step #02), and the direct-coupling pressure reducing control of the first clutch C1 is performed (Step #03). In the present embodiment, the direct-coupling pressure reducing control reduces the engagement pressure of the first clutch C1 to the raid-control set pressure Pa (an example of a target pressure). In the present embodiment, the processes of Steps #02 and #03 start at the same time. The process of Step #02 continues to be performed until the second brake B2 is brought into the slipping engaged state (No at Step #04). The process of Step #03 reduces the engagement pressure of the first clutch C1 to the mid-control set pressure Pa, and the engagement pressure of the first clutch C1 reaches the mid-control set pressure Pa at least by the time when the rotational speed control of the rotary electric machine of Step #05 starts.

When the second brake B2 is brought into the slipping engaged state (Yes at Step #04), the rotational speed control of the rotary electric machine MG starts (Step #05). The rotational speed control of the rotary electric machine MG of Step #05 continues to be performed until the end condition for the slip rotational speed control is satisfied (No at Step #06). When the end condition for the slip rotational speed control is satisfied (Yes at Step #06), the direct-coupling engagement control of the second brake B2 is performed (Step #07), and the direct-coupling pressure increasing control of the first clutch C1 is performed (Step #08). Then, the process ends. In the present embodiment, the processes of Steps #07 and #08 start at the same time, and end at the same time.

5. Other Embodiments

Finally, other embodiments of the drive device according to the present invention will be described. Each structure disclosed in each of the embodiments can be applied in combination with structures disclosed in other embodiments, unless any contradiction occurs.

(1) In the above-described embodiment, the structure has been described as an example in which the rotor of the rotary electric machine MG always integrally rotates with the intermediate shaft M serving as the speed change input shaft of the speed change mechanism 13 in the drive device 1 controlled by the control device 3. However, embodiments of the present invention are not limited to this, and an embodiment can have a structure in which another device (hereinafter called "interposed device") is interposed, in the power transmission path, between a rotor shaft to which the rotor of the rotary electric machine MG is fixed and the intermediate shaft M. In other words, the structure can be such that the interposed device is provided in the power transmission path between the rotary electric machine MG and the speed change mechanism 13.

For example, the structure can include a torque converter (an example of a fluid coupling) having a lock-up clutch, as the interposed device. In such a structure, the second engagement control unit 32 can be structured to control the engagement pressure of the lock-up clutch, instead of an engagement device for shifting included in the speed change mechanism 13. In this case, the lock-up clutch corresponds to the "second engagement device" in the present invention.

The structure can include a clutch (hereinafter called "fourth clutch"), as the interposed device. In such a structure, the first engagement control unit 31 can be structured to control the engagement pressure of the fourth clutch, instead of an engagement device for shifting included in the speed change mechanism 13. In this case, the fourth clutch corresponds to the "first engagement device" in the present invention. In such a structure, the second engagement control unit 32 can be structured to control the engagement pressure of the fourth clutch, instead of an engagement device for shifting included in the speed change mechanism 13. In this case, the fourth clutch corresponds to the "second engagement device" in the present invention.

(2) In the above-described embodiment, the structure has been described as an example in which the output shaft O serving as the speed change output shaft is directly drivingly coupled to the output differential gear unit 14. However, embodiments of the present invention are not limited to this, and an embodiment can have a structure that includes a clutch (hereinafter called "fifth clutch") in the power transmission path between the output shaft O and the output differential gear unit 14. In such a structure, the first engagement control unit 31 can be structured to control the engagement pressure of the fifth clutch, instead of an engagement device for shifting included in the speed change mechanism 13. In this case, the fifth clutch corresponds to the "first engagement device" in the present invention. In such a structure, the second engagement control unit 32 can be structured to control the engagement pressure of the fifth clutch, instead of an engagement device for shifting included in the speed change mechanism 13. In this case, the fifth clutch corresponds to the "second engagement device" in the present invention.

(3) In the above-described embodiment, the structure has been described as an example in which the second engagement control unit 32 starts the direct-coupling pressure increasing control in accordance with the start of the direct-coupling engagement control by the first engagement control unit 31, and increases the engagement pressure of the second engagement device so as to end the direct-coupling pressure increasing control in accordance with the end of the direct-coupling engagement control by the first engagement control unit 31. However, embodiments of the present invention are not limited to this, and an embodiment can have a structure in which the time when the first engagement control unit 31 starts the direct-coupling engagement control differs from the time when the second engagement control unit 32 starts the direct-coupling pressure increasing control, or a structure in which the time when the first engagement control unit 31 ends the direct-coupling engagement control differs from the time when the second engagement control unit 32 ends the direct-coupling pressure increasing control.

(4) In the above-described embodiment, the structure has been described as an example in which the first engagement control unit 31 gradually increases the engagement pressure of the first engagement device from the slip engagement pressure to the direct-coupling engagement pressure when performing the direct-coupling engagement control of the first engagement device. However, embodiments of the present invention are not limited to this, and an embodiment can have a structure in which the first engagement control unit 31 increases the engagement pressure of the first engagement device in a stepwise manner from the slip engagement pressure to the direct-coupling engagement pressure when performing the direct-coupling engagement control of the first engagement device. In the above-described embodiment, the structure has been described as an example in which the first engagement control unit 31 gradually reduces the engagement pressure of the first engagement device from the direct-coupling engagement pressure to the slip engagement pressure when performing the slip engagement control of the first engagement device. However, embodiments of the present invention are not limited to this, and an embodiment can have a structure in which the first engagement control unit 31 reduces the engagement pressure of the first engagement device in a stepwise manner from the direct-coupling engagement pressure to the slip engagement pressure when performing the slip engagement control of the first engagement device.

(5) In the above-described embodiment, the structure has been described as an example in which the second engagement control unit 32 gradually increases the engagement pressure of the second engagement device from the mid-control set pressure Pa to the post-control set pressure Pb when performing the direct-coupling pressure increasing control of the second engagement device. However, embodiments of the present invention are not limited to this, and an embodiment can have a structure in which the second engagement control unit 32 increases the engagement pressure of the second engagement device in a stepwise manner from the mid-control set pressure Pa to the post-control set pressure Pb when performing the direct-coupling pressure increasing control of the second engagement device. In the above-described embodiment, the structure has been described as an example in which the second engagement control unit 32 reduces the engagement pressure of the second engagement device in a stepwise manner from a pressure higher than the mid-control set pressure Pa to the mid-control set pressure Pa when performing the direct-coupling pressure reducing control of the second engagement device. However, embodiments of the present invention are not limited to this, and an embodiment can have a structure in which the second engagement control unit 32 gradually reduces the engagement pressure of the second engagement device from a pressure higher than the mid-control set pressure Pa to the mid-control set pressure Pa when performing the direct-coupling pressure reducing control of the second engagement device.

(6) In the above-described embodiment, the structure has been described as an example in which, when controlling an engagement device for shifting to be in the directly coupled engaged state, the hydraulic pressure control unit 34 performs the constant pressure control for the engagement device for shifting. However, embodiments of the present invention are not limited to this. For example, an embodiment can have a structure in which, when controlling the engagement device for shifting to be in the directly coupled engaged state, the hydraulic pressure control unit 34 sets the command value for the output hydraulic pressure issued to the hydraulic pressure control valve for controlling the hydraulic pressure supplied to the engagement device for shifting, not to a constant value, but to a value variable in accordance with change in the line pressure.

(7) In the above-described embodiment, the structure has been described as an example in which the drive device 1 controlled by the control device 3 is a drive device for a hybrid vehicle. However, embodiments of the present invention are not limited to this, and the present invention can be applied to a control device that controls a drive device for driving an electric vehicle. The "electric vehicle" refers to a vehicle equipped with only the rotary electric machine as a source of driving force of the wheels 15.

(8) In the above-described embodiment, the structure has been described as an example that includes the internal combustion engine control unit 23 provided separately from the control device 3. However, embodiments of the present invention are not limited to this, and an embodiment can have a structure in which the internal combustion engine control unit 23 is integrated with the control device 3. The assignment of the functional units in the control device 3 described in the embodiment above is a mere example. A plurality of such functional units can be combined, and each of the functional units can further be partitioned.

(9) Regarding the other structures, the embodiments disclosed in the present specification are also examples in all respects, and embodiments of the present invention are not limited to them. In other words, structures not described in the claims of the present application can be modified as appropriate within the scope not departing from the object of the present invention.

INDUSTRIAL APPLICABILITY

The present invention can suitably be used in a control device that controls a drive device for a vehicle provided with a speed change mechanism in a power transmission path connecting a rotary electric machine and wheels, and also provided with a plurality of engagement devices in the power transmission path.

DESCRIPTION OF THE REFERENCE NUMERALS

1: Drive device (drive device for vehicle)
3: Control device
13: Speed change mechanism
15: Wheel
26: Hydraulic pressure control device
30: Slip rotational speed control unit
31: First engagement control unit
32: Second engagement control unit
34: Hydraulic pressure control unit
B1: First brake (engagement device)
B2: Second brake (first engagement device)
C0: Disconnecting clutch (third engagement device)
C1: First clutch (second engagement device)
C2: Second clutch (engagement device)
C3: Third clutch (engagement device)
E: Internal combustion engine
MG: Rotary electric machine
Pa: Mid-control set pressure
Pb: Post-control set pressure

The invention claimed is:

1. A control device that controls a drive device for a vehicle provided with a speed change mechanism in a power transmission path connecting a rotary electric machine and wheels, and also provided with a plurality of engagement devices in the power transmission path, the control device comprising:
a first engagement control unit that controls, as subject control, an engagement pressure of a first engagement device serving as one of the engagement devices to a slip engagement pressure; and
a second engagement control unit that controls an engagement pressure of a second engagement device that is an engagement device different from the first engagement device and is one of the engagement devices controlled so as to be in a directly coupled engaged state while the subject control is performed, wherein
an internal combustion engine is drivingly coupled to the rotary electric machine via a third engagement device;
the control device is structured to perform, while the subject control is performed, internal combustion engine starting control that starts the internal combustion engine in a stop state while causing a state of the third engagement device to transition from a released state to the directly coupled engaged state; and
when the subject control and the internal combustion engine starting control is commanded based on a start request of the internal combustion engine in the directly coupled engaged state of the second engagement device, the second engagement control unit performs direct-coupling pressure reducing control that reduces the engagement pressure of the second engagement device to a pressure lower than that before the subject control and the internal combustion engine starting control are performed.

2. The control device according to claim 1, wherein
the first engagement control unit controlling the engagement pressure of the first engagement device performs direct-coupling engagement control that gradually increases the engagement pressure of the first engagement device from the slip engagement pressure to a direct-coupling engagement pressure on the condition that the subject control has been determined to be ended, and
while the first engagement control unit performs the direct-coupling engagement control, the second engagement control unit performs direct-coupling pressure increasing control that gradually increases the engagement pressure of the second engagement device, from the mid-control set pressure that is an engagement pressure while the subject control is performed, to a post-control set pressure that is higher than the mid-control set pressure.

3. The control device according to claim 2, wherein the second engagement control unit increases the engagement pressure of the second engagement device so as to start the direct-coupling pressure increasing control in accordance with start of the direct-coupling engagement control by the first engagement control unit, and so as to end the direct-coupling pressure increasing control in accordance with end of the direct-coupling engagement control.

4. The control device according to claim 1, further comprising:
a hydraulic pressure control unit that controls a line pressure via a hydraulic pressure control device included in the drive device for a vehicle, wherein
the second engagement device is a hydraulically driven engagement device included in the speed change mechanism;
the hydraulic pressure control device includes a hydraulic pressure control valve that receives supply of the line pressure and outputs a hydraulic pressure as an operating pressure to the second engagement device;
when the second engagement control unit controls the second engagement device so as to be in the directly coupled engaged state so that the speed change mechanism establishes a shift speed, the second engagement control unit performs constant pressure control that sets a command value to the hydraulic pressure control valve for the output hydraulic pressure to a constant pressure higher than the line pressure; and
the second engagement control unit prohibits execution of the constant pressure control while the subject control and the internal combustion engine starting control are performed based on the start request of the internal combustion engine in the directly coupled engaged state of the second engagement device.

5. The control device according to claim 1, wherein the slipping engaged state of the first engagement device is a state in which transfer torque exists in the first engagement device, and in which a rotational speed difference exists between two members engaged by the first engagement device.

* * * * *